(12) United States Patent
Goiffon et al.

(10) Patent No.: US 6,785,882 B1
(45) Date of Patent: Aug. 31, 2004

(54) PROCESS-DRIVEN TOOL INTERFACE FOR AN OBJECT MANAGEMENT SYSTEM

(75) Inventors: David A. Goiffon, Shoreview, MN (US); Gerald E. Hartmann, Minneapolis, MN (US); David R. Johnson, Oakdale, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/317,414

(22) Filed: May 24, 1999

(51) Int. Cl.⁷ .................................................. G06F 9/44
(52) U.S. Cl. ........................................ 717/120; 707/200
(58) Field of Search ........................... 717/120; 700/200

(56) References Cited

U.S. PATENT DOCUMENTS

| | | | |
|---|---|---|---|
| 5,642,511 A | * 6/1997 | Chow et al. | 717/1 |
| 5,845,119 A | * 12/1998 | Kozuka et al. | 717/2 |
| 5,867,707 A | * 2/1999 | Nishida et al. | 717/1 |
| 5,907,704 A | * 5/1999 | Gudmundson et al. | 717/1 |
| 5,949,998 A | * 9/1999 | Fowlow et al. | 717/1 |
| 5,991,535 A | * 11/1999 | Fowlow et al. | 717/2 |
| 6,226,792 B1 | * 5/2001 | Goiffon et al. | 717/120 |

OTHER PUBLICATIONS

Template Software, Lanaguge Reference (LANG) p. 13–7, 1995.*
Template Software, User's Guide Development Environment (ENVIR) p. Chapters 1–4 and pp. of Chapter 5 5–1 to 5–41 and p. 5–87, 1995.*
Object–Oriented Information Systems Planning and Implementations, David A. Taylor, pp. 1–357, published Apr. 10, 1992.*

* cited by examiner

Primary Examiner—Todd Ingberg
(74) Attorney, Agent, or Firm—Beth L. McMahon; Mark T. Starr; Charles A. Johnson

(57) ABSTRACT

A process-driven object management system for managing data and code modules is disclosed. The object management system includes a repository that stores objects, wherein ones of the objects referred to as "Asset elements" each describe a respective code or data module. The object management system includes a set of scripted tools for performing renovation, transformation, and code development tasks on the code and data modules. According to one aspect of the invention, the tool invocation constructs are stored as objects in the repository, such that some of the same object management tools and automated repository interface functions used to manage the Asset element can also be used to manage and veiw the tool objects.

46 Claims, 17 Drawing Sheets

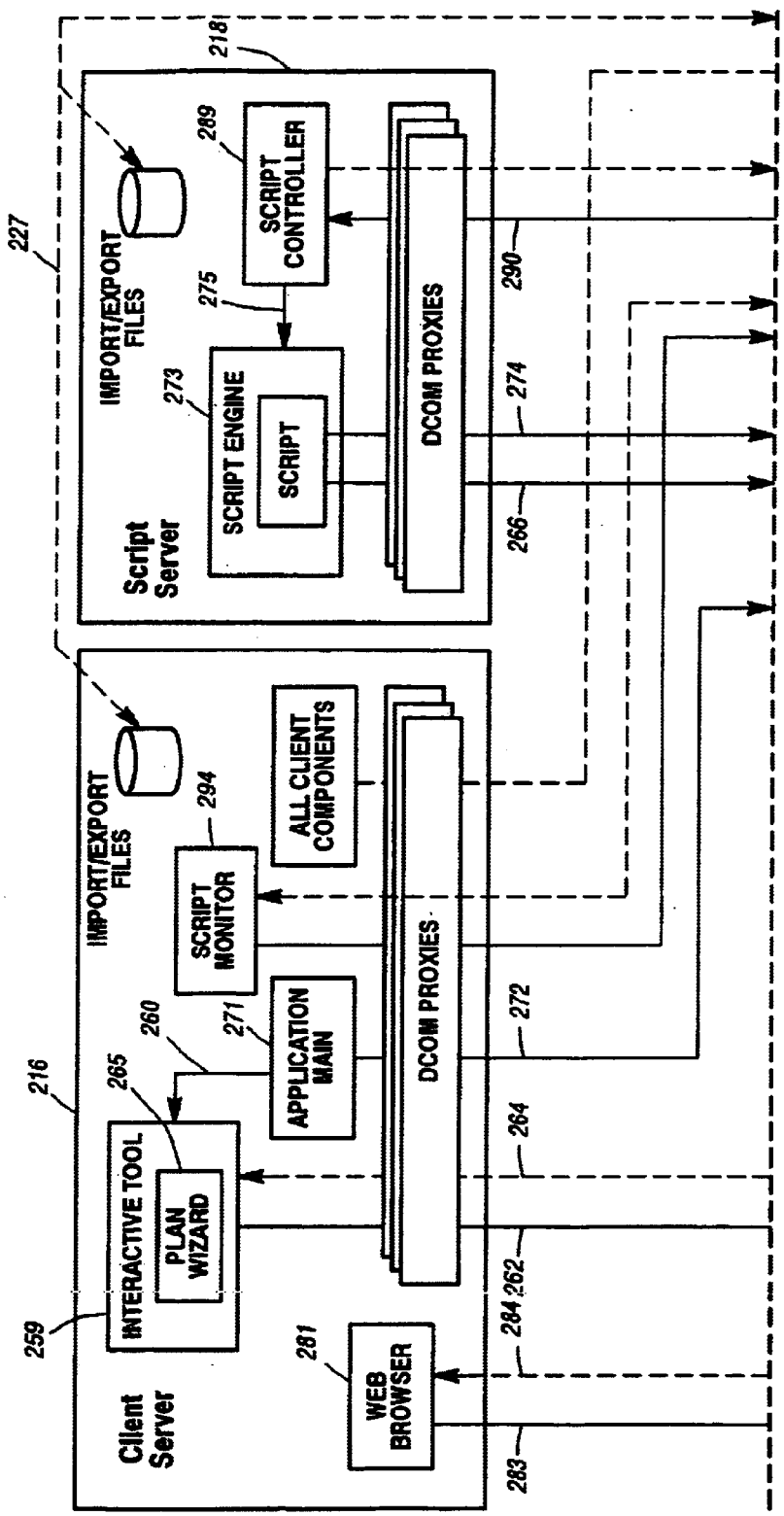

PROCESS-DRIVEN TOOL INTERFACE FOR AN OBJECT MANAGEMENT SYSTEM

CROSS-REFERENCES

This patent application is related to the co-pending U.S. patent application Ser. No. 09/173,095, entitled, "An Object Management System Supporting the Use of Application Domain Knowledge Mapped to Technology Domain Knowledge", filed Oct. 14, 1998 by Goiffon et al., which is assigned to the assignee of the present invention, and incorporated herein by reference in its entirety.

This patent application is further related to the co-pending U.S. patent application Ser. No. 09/188,514, entitled, "System and Method for Defining and Managing Reusable Groups of Software Constructs within an Object Management System", filed on Oct. 14, 1998, by Goiffon et al., which is assigned to the assignee of the present invention, and incorporated herein by reference in its entirety.

BACKGROUND OF THE INVENTION

1. Field of the Invention

This invention relates generally to a system for increasing productivity in managing, tracking, and using reusable software modules; and more particularly, relates to an object management system having a repository for storing objects wherein ones of the objects are descriptive of a respective software module cataloged by the object management system, and wherein other ones of the objects are system objects describing the manner in which scripted tools that are available for performing various operations on the software modules may be invoked in a manner that is independent of the scripted tool interfaces.

2. Description of the Prior Art

Computer technology is rapidly evolving. This provides a challenge for software developers who have an increasingly difficult time keeping pace with the various adaptations required to allow existing software to meet ever-changing requirements. For example, currently, much work is being done to adapt software applications and data repositories residing on mainframe systems so that these applications may be accessed via web browsers. Alternatively, it may be desirable to modify source code designed for operation on Unix platforms so that it is operational on other platforms such as Microsoft Windows NT platforms. Even within a so-called family of computers, where the architecture of the new generation of computers has been designed to maintain a certain degree of compatibility with the prior generation, it is often a major task to adapt computer programs to the new architecture.

In addition to the types of transformations discussed above, an increasing amount of coding effort is being spent on code renovation. This is particularly true with the millennium approaching. Many billions of dollars will be spent world wide adapting software to properly handle dates falling after Dec. 31, 1999 to remedy what has commonly become known as the "Y2K problem". Another type of renovation effort is needed to allow software to handle the European Monetary Unit (EMU), or "Euro", which will become the common currency within many European countries within the next few years. Still other types of conversion are necessary when porting software between two machines that do not use the same word sizes. Software modification is further required when porting code to a machine having an expanded addressing space.

Many vendor tools are available to aid users in performing the types of transformation and renovation operations discussed above. Some of these tools may be used to translate an entire code sequence so that the code sequence becomes operational from within a different environment.

Other vendor tools perform the transformation process by making the interfaces of a code sequence available from an external environment, while allowing the body of the code sequence to remain unchanged. These tools produce so-called "wrappers" for the code interfaces, which are surrounding layers of code and data structures that hide the original code environment from the calling entity, and that allow the original code sequence to be called from an external environment. In some instances, part, or all, of the wrapper will be ported to the external (calling) system. For example, DGate Ace, which is commercially available from the Unisys Corporation, is a tool that builds a wrapper around the code entry points of enterprise server Open OLTP transaction applications. This wrapper makes the code entry points available to calling programs residing within a Microsoft ActiveX environment.

Various vendor tools are likewise available to perform analysis and renovation functions.

For example, Fulcrum 2000, commercially available from RMC, Ltd., is a tool that performs code analysis operations on a specified code sequence to flag potential Y2K problems. Another similar code analysis tool is described in U.S. Pat. No. 5,488,714 to Skidmore, which is assigned to the assignee of this invention. The Skidmore system performs code analysis on code sequences to produce a listing of recommendations for source code conversion. In the described embodiment, the listing of recommended changes is used to convert code designed for operation within a 16 Megabyte (Mbyte) memory environment to code operational within a 64 Megabyte memory environment.

In addition to vendor tools that are used to perform transformation and renovation operations, other types of tools are commonly used when updating and managing code objects. For example, file transfer utilities are needed to move code objects from platform to platform. Other utilities such as compilers and linkers are needed to generate executables for source code objects that have been modified. Each of these tools may have a unique interface, and unique requirements.

The set of vendor tools which are integrated for use by an object management system will vary from system to system depending on user needs. As mentioned above, many of these tools have unique interfaces that include particular command sets, modes of operation, requirements for operation, and requirements concerning input and output parameter formats. Some of these tools require that some preprocessing or preliminary actions be performed before a given tool may be invoked on a set of software modules. As a simple example, before a linker may be invoked, the code to be linked must first be compiled. Other tools require that data be copied to a particular location within a server before the transformation process on that data may occur. This may be accomplished, for example, by using a program utilizing the File Transfer Protocol (FTP) to copy files from a host system to a location within an external server. Since the user may want to perform a combination of transformation, renovation, and code development processes using multiple tools, the user must become familiar with a variety of tool interfaces. The associated learning curve adds to the time and effort required to perform the task.

Another problem associated with performing transformation, renovation, and code development operations involves identifying the various code and data components that must be submitted to undergo the conversion process. In large complex systems, program calls and data exchanges are made between many re-usable software components. The inter-relationships between these code components are not always obvious. Therefore, when a particular functionality is to be ported from one environment to another, it is often difficult to decide exactly which code and data components must actually undergo some type of transformation to accomplish the task.

What is needed is a comprehensive system which hides the complexities associated with a variety of object management tools, and further hides the particularities of the code interfaces, from the end user so that renovation and transformation operations may be performed more quickly, and with fewer errors.

OBJECTS

It is a primary object of the invention to provide an improved object management system;

It is another object of the invention to provide an object management system for supporting transformation, renovation, and code development operations performed by a set of disparate tools;

It is yet another object of the invention to provide an object management system wherein tools for managing, manipulating, and modifying objects are invoked independently of individual tool interfaces;

It is another object of the invention to provide a system for managing, manipulating, and modifying objects using a disparate set of tools by utilizing natural language phrases indicative of the process to be performed on the objects;

It is yet another object of the invention to provide a system for managing, manipulating, and modifying objects using a process-based interface which allows objects to be selected for processing based on natural language descriptions which are independent of the storage structure within which the objects are stored;

It is another object of the invention to provide a system for managing, manipulating, and modifying objects using a process-based interface, wherein the process-based interface is defined using a model;

It is still a further object of the invention to provide a object management system including a disparate tools, each performing one or more operations on selected objects stored within the system, the object management system further for storing a set of rules (protocols) for describing the requirements associated with each of the operations performed by each of the tools;

It is yet another object of the invention to provide an object management system for storing a set of processes, each process being comprised of a set of rules and describing the general manner in which a set of tasks may be performed on a set of objects to accomplish a desired result;

It is yet another object of the invention to provide an object management system for allowing users to select and update any stored process to create a particularized plan designed to perform a specific result on a selected group of one or more stored objects;

It is a further object of the invention to provide an automated interface for allowing the creation of particularized plans, protocols, and processes;

It is a further object of the invention to provide an object management system including a repository capable of storing protocols, processes, and plans as objects;

It is another object of the invention to provide an object management system for supporting transformation operations performed on selected ones of stored objects wherein the transformation steps to be performed may be specified in terms of processes described by natural-language phrases;

It is another object of the invention to provide an object management system for supporting renovation operations performed on selected ones of stored objects wherein the renovation steps to be performed may be specified in terms of processes described by natural-language phrases;

It is a further object of the invention to provide a system for performing multiple transformation and renovation steps on a selected set of objects using a single process invocation;

It is yet another object of the invention to process a selected set of objects using selected functions provided by multiple tools, all invoked using a single process invocation;

It is still another object of the invention to provide an object management system providing for the manual re-execution of stored plans;

It is yet another object of the invention to provide an object management system providing for the automated re-execution of stored plans;

It is a further object of the invention to provide an object management system wherein the impact of performing modifications to code, data, and tool modules is minimized with respect to the protocols, processes, and plans;

It is another object of the invention to provide an object management system that stores interrelationships between protocol, process, and plan objects, wherein the interrelationships provide an efficient means of performing impact analysis when changes occur to any of the objects; and It is another object of the invention to provide an object management system capable of storing execution history associated with each of the stored plans for tracking the manner in which objects stored in the system have been created, manipulated, and used.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention.

SUMMARY OF THE INVENTION

The forgoing objects and other objects and advantages are provided in the current invention, which is a process-driven object management system for managing data and code modules. The object management system includes a repository that stores objects, wherein ones of the objects referred to as "Asset elements" each describe a respective code or data module. These objects provide a catalog that inventories the code and data modules being managed by the system. The repository further stores relationships between the objects that model the relationships existing between the code and/or data modules modeled by the respective objects. The objects and object relationships may be viewed by users and analyzed by automated analysis tools to provide insight into the interdependencies existing between the software modules.

The object management system includes a set of tools for performing renovation, transformation, and code development tasks. The current invention provides a process-based interface to this disparate set of vendor tools. This interface is developed using Protocols, Processes, and Plans. Protocols are constructs that each stores a script for invoking a respective scripted tool to execute a particular function. The Protocols are defined in a generic manner such that any software modules that might be provided as input parameters or generated as output parameters of the function invocation are specified as variables to be supplied at execution time.

Processes are constructs that store definitions descriptive of a particular task to be performed. The task to be performed is described using one or more protocols and/or one or more other processes. That is, a process is a grouping of protocols and other processes, wherein the functions described by the protocols and processes will perform a desired task. Processes may further include logical statements written in any scripting language, and which are included to perform error and recovery operations. Like protocols, processes are written in a generic format that identifies a type of software module that can be the target of the task, but does not identify a specific software module or modules on which the task is to be performed.

Processes can be used to develop Plans, wherein a Plan is a developed script that may be executed by a script engine to complete the task described by an associated process. Plans include a designation of the software modules that are to be used as input and output parameters of the task. A Plan may be provided to a script engine for execution either immediately after the plan is created from a process, or on a scheduled basis.

Plans may be created by users having a minimal amount of system knowledge. This is accomplished by an automated Plan development tool that polls the user to select a Process to be developed into a Plan. This polling can be done using natural language expressions stored within the Processes themselves. Furthermore, the user can be polled for the software modules that are to be operated on and/or created by a selected Process. This is accomplished using the Process information indicating the allowable types of software modules that may be associated with the Process. In this manner, a user can initiate the execution of complex operations without understanding the complexities of, or the interrelationships between, tools and tool interfaces. Furthermore, the user need not understand the interdependencies existing between the software modules that are to be the target of the initiated operation.

In the preferred embodiment, the Protocols, Processes, and Plans are each stored as objects in the object management system repository. These objects, which may be referred to as "System elements", are stored in a manner that is similar to the way in which the Asset elements describing the software modules are stored. Furthermore, the associations between Protocols, Processes, and Plans are stored as relationships between the respective objects in a manner that is similar to the way relationships between the software modules are represented.

Representing the Protocols, Processes, and Plans as objects within the object management system has several advantages. Some of the same tools that are used within the system to create, update, manage, and view the Asset elements can be used to perform similar functions on the System elements. The relationships existing between the various System elements allow a user or an automated development tool to readily discover the interdependencies existing between the constructs. This is valuable when performing impact analysis after a modification is made to one of the System elements. Additionally, the repository interface includes automated functions that can be invoked by both the automated Plan development tool and the script engine to simplify Plan development and execution.

In the preferred embodiment, the definition of the System elements is model driven. This means that each of the System elements, as well as the relationships that may exist between the elements, are created using a pre-defined element type or relationship type definition that is also stored within the repository. The model definition both simplifies the system design and makes operation more robust because the various tools in the system can be synchronized with the element and relationship type definitions instead of having to be aware of special-case and particularized element descriptions. Additionally, modifications to the elements can be more readily accomplished because a whole class of element definitions can be modified by making a single change to an element type definition. The type definitions also allow the automated Plan development tool to efficiently query the user for process and Asset element selections.

Another aspect of the current invention involves the recordation of Plan execution status. Plan Execution Record constructs are created after the execution of any Plan. These constructs, which in the preferred embodiment are stored as System elements, record information and status about Plan execution that are useful in documenting the software development process.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

FIGS. 2A and 2B, when arranged as shown in FIG. 2, are a block diagram of the preferred embodiment of the Object Manager System within which the current invention operates;

DETAILED DESCRIPTION OF THE PREFERRED EMBODIMENTS

Functional Components of the Object Management System

Figure 1:
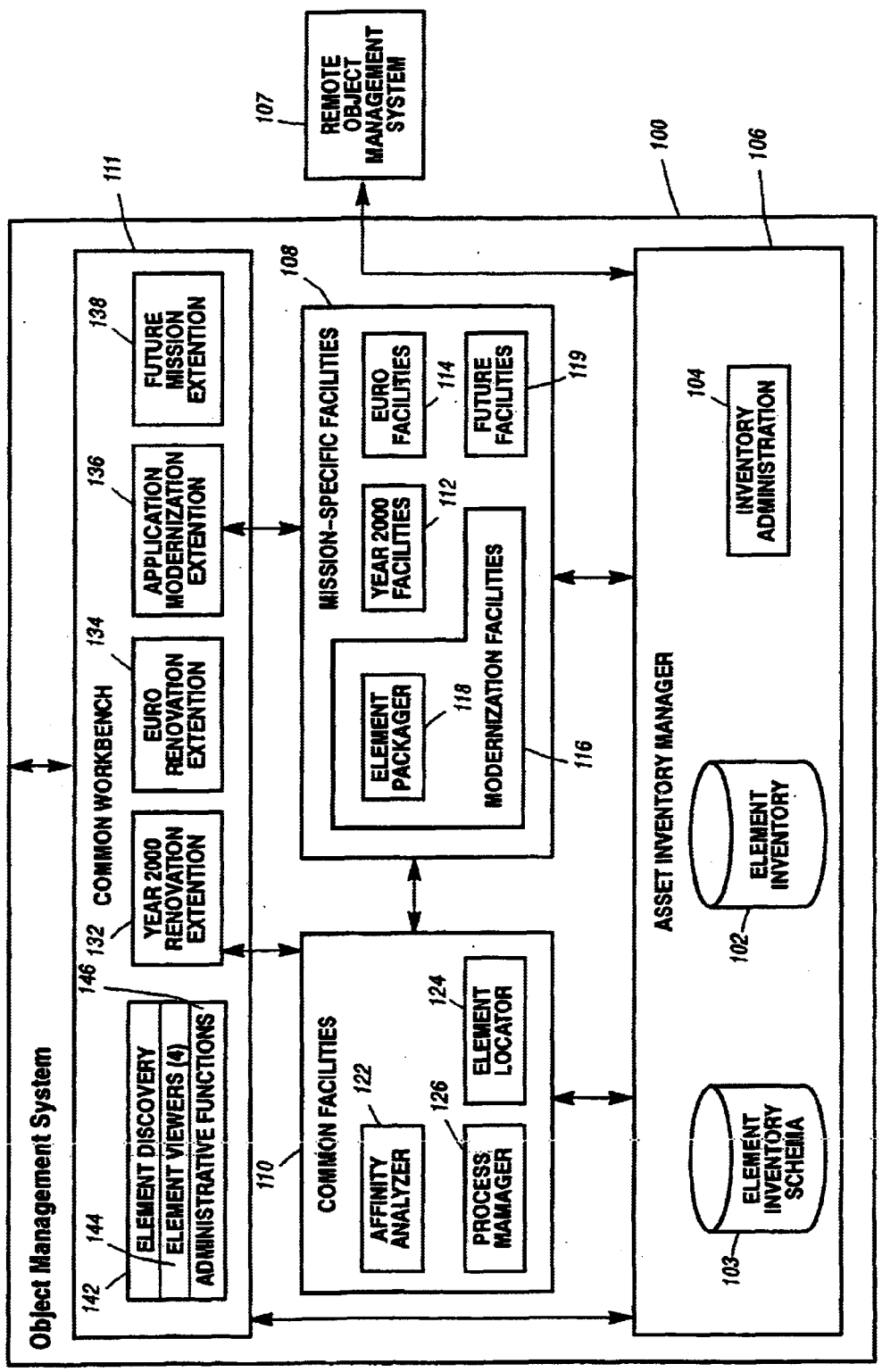
FIG. 1 is a block diagram of the major functional components of the Object Management System within which the current invention operates.

FIG. 1 is a block diagram of the major functional components of the Object Management System 100 within which the current invention operates. The system includes Element Inventory 102, which stores the various objects, or "elements", that are used to manage the code and data components (not shown in FIG. 1) that support an enterprise. Each of the objects stores meta-data, or "data about data". This meta-data describes, among other things, the location of, and the type of, data or code that is stored within the respective component or module residing elsewhere within the system. This meta-data also describes the various relationships that the respective data or code module has with other data and/or code modules. In this manner, the Element Inventory 102 serves as an index which points to, and describes, the various data and code resources used to perform the functions of the particular Information Technology (IT) platform which utilizes the Object Management System 100. This index provides a mechanism which allows a very large body of reusable code and data components to be readily managed using automated tools, and further provides users with an efficient means of understanding the complex relationships and interdependencies existing between the code and data components.

The Element Inventory 102 may also include objects, or elements, that contain meta-data that describes the protocols, processes, plans, and tools used within the Object Management System, as will be described in detail below.

According to the preferred embodiment, each element within the Element Inventory 102 is associated with a respective pre-defined element type. Examples of element types may include "Table", "TableColumn", or "Program". These element types are stored in the Element Inventory Schema (EIS) 103. The element type associated with a particular element is representative of the functionality of the associated data, code or system component. EIS further stores relationship types, which define how one element type is related to another element type. This will be discussed further below.

The Element Inventory 102 is supported using functions provided by Inventory Administration 104. These support functions include the backup facilities used to make a copy of selected elements, and restore facilities used to restore an existing saved copy of an element to the Element Inventory. The administration functions further include export and import operations provided to exchange information between the Element Inventories of one or more remote Object Management Systems such as that shown as Remote Object Management System 107. The export function provides a copy of an element to the remote system, whereas the import function receives a copy of an element from a remote system, and stores the copy within the Element Inventory 102. Export/import exchanges are accomplished using self-defining intermediate file structures of the type utilized by various export/import standards such as eXtended Markup Language (XML).

Inventory Administration 104 further includes an archive function. This function is similar to the export operation in that it creates a self-defining intermediate file. Unlike the export function, which allows a copy of an exported element to remain within the Element Inventory 102, the archive function deletes an element from the Element Inventory while retaining an archived record of the element for possible later use.

The Inventory Administration 104 also supports a Migration Function. This function is utilized to copy an element and the corresponding inventory information pertaining to that element between multiple Object Management Systems that are at different release levels.

The Element Inventory 102 and Inventory Administration 104 are managed by the Asset Inventory Manager 106. The Asset Inventory Manager (AIM) is the software that provides an interface to the Element Inventory 102 and Element Inventory Schema 103. One of the functions of the AIM is to hide the underlying repository implementation by providing an Application Program Interface (API) tailored for elements. The AIM provides an interface that supports the operations required by both the Mission Specific Facilities, shown in Block 108, and the Common Facilities, shown in Block 110.

The types of Mission-Specific Facilities shown in Block 108 may vary between Object Management Systems as required by the needs of the users. These include the renovation, transformation, and development tools that are used to adapt existing software to changing user requirements. When tools are installed, they are registered in the Element Inventory 102. That is, for each tool, one or more elements are created that define each of the tools, and that define the types of relationships these tools may have with other code and/or data constructs within the system. Thus, the tools that are used by the Object Management System are inventoried in a similar manner to all other code and data constructs within the system.

New versions of tools may be installed over time. When this occurs, updated versions of the associated elements are also created and interrelated. The relationship between a version of a tool and code and/or data elements that may be created by the tool are also recorded in the Element Inventory. Tool administration functions are performed using the graphical user interface associated with the Common Workbench 111 to be discussed below.

FIG. 1 illustrates some of the Mission-Specific Facilities, or tools, that will be commonly provided by the Object Management System 100 of the preferred embodiment, including the Year 2000 Facilities 112, the Euro Facilities 114, and the Modernization Facilities 116. The Year 2000 Facilities 112 contain the user interfaces and tools required to support analysis and renovation of applications to be ready for the year 2000. Euro Facilities 114 include the user interfaces and tools required to convert business applications into code which handles the new European Monetary Unit (Euro). Modernization Facilities involves the user interfaces and tools required to integrate new applications with existing applications and/or to re-implement all or parts of existing applications within different systems and platforms, or using different software technologies.

Each of the Mission-Specific Facilities will generally be invoked on a group of related code and data components. To locate the related code and data components on which these Mission-Specific Facilities may be invoked, some type of element identification function must be invoked using the relationships defined within Element Inventory 102 as will be discussed below.

After a group of code or data components has been identified as the target of some type of renovation or transformation operation, Element Packager 118 is utilized to build the identified elements into a package that includes all of the code and data necessary to transform the group of components. To perform this function, the Element Packager must extract additional information about each of the elements from Element Inventory 102.

After element packaging is completed, the Modernization Facilities 116 are used to perform some type of transformation operation on the element package. This may be accomplished by either wrapping all, or part, of an existing element package with layers of software called a "wrapper" that provide an interface bridge between the wrapped elements that makes that package accessible from a different operating environment. Alternatively, some of the elements in the package may be entirely re-implemented using a new technology.

The Mission-Specific Facilities shown in FIG. 1 are exemplary only. Still other types of tools could be included within the current Object Management System 100, including, but not limited to, facilities to migrate software to platforms having a different word size or address-space size. These are represented by Future Facilities 119.

Object Management System 100 further includes Common Facilities 110. These functions aid the user in understanding the relationships between elements, and also aid in invoking the tools used to perform the transformation and renovation operations. Common Facilities 110 include the Affinity Analyzer 122, which is a tool that analyzes the relationships existing between various elements contained within the Element Inventory 102. For example, the Affinity Analyzer determines which elements are involved in the processing performed to accomplish a particular function. The Affinity Analyzer 122 further provides a graphic display representing the various elements and element relationships for those code and data components provided by the IT platform. The graphical displays, which are capable of illustrating complex element networks, are used for advanced impact analysis and element packaging purposes. For example, before a particular code module is modified, the relationships existing between the associated element that models that code module and other elements may be used to determine which other code or data components need to be modified to maintain compatibility. These relationships may be graphically depicted using the Affinity Analyzer 122. The Affinity Analyzer allows software analysts to interrogate and visually mine single or disparate sets of elements without having to understand the details of the elements or relationships. Query and exploration, hypothesis generation, and knowledge discovery routines eliminate the need to compose complex queries for investigating how various code and data components are structured or interrelate. In the preferred embodiment, the Affinity Analyzer is implemented using the Netmap tool commercially available from the Alta Corporation.

The Common Facilities 110 further comprises the Element Locator 124. This tool uses Natural Language Understanding (NLU) technology to locate potentially reusable elements in the Element Inventory 102. This makes the information stored in the Element Inventory more accessible to other environments since the details of Element Inventory structure do not have to be known from outside the local system. The Element Locator 124 is able to perform a very efficient "concept" search using application domain mappings stored in the Element Inventory 102. The Element Locator 124 is described in detail in the co-pending application entitled "An Object Management System Supporting the Use of Application Domain Knowledge Mapped to Technology Domain Knowledge", referenced above and incorporated herein by reference in its entirety.

Also included in the Common Facilities 110 is the Process Manager 126. The Process Manager is a rules-based tool that allows a user to define objects called protocols and processes that are stored in Element Inventory 102. These objects provide a mechanism whereby a user can invoke scripted tools and certain other functions provided by the Asset Inventory Manager 100 without being familiar with the actual tool interfaces associated with the tool invocation. Using these objects, a user can invoke scripted tools by specifying a desired outcome instead of by specifying particular tool sequences. Thus the complexity associated with locating, transforming, processing, and managing the code and data modules of an IT department is largely hidden from the user. Moreover, because protocol and processes are defined and managed as objects, the impact-analysis operations that must be performed when tools, code modules, or data modules are modified or deleted is largely simplified. This reduces development and training times, and further makes complex tasks less error-prone. The use of protocols and processes will be discussed in detail below.

A user accesses both Common Facilities 110 and the Mission-Specific Facilities 108 through a graphical user interface represented on FIG. 1 as the Common Workbench (Workbench) 111. In the preferred embodiment, Object Management System 100 is a web-based system having a "web-like" interface, although other types of interfaces, graphical or non-graphical, could be utilized. The Workbench 111 is shown providing selections for Year 2000 Renovation 132, Euro Renovation 134, Application Modernization 136, and any other additional future extension, shown as Future Mission Extension 138, that may be needed.

Also included in the Workbench 111 are functions that allow the user to manage, view, and report on the elements and element relationships existing within the Element Inventory 102. These tools include Element Discovery Functions 142. Element discovery refers to the process of initially creating elements and the relationships among elements in the Element Inventory. Generally, an Element Discovery Function will analyze a target group of software and data constructs and the interrelationships between these constructs. The Element Discovery Function will then automatically create elements associated with the code and data constructs. If the Object Management System is model driven, the Element Discovery Function 142 will utilize the various element type definitions stored within the model, for example, "program" or "database", to create the elements. As discussed above, each of these elements includes meta-data that describes the location and function of the associated code or data element. This meta-data will further describe the relationships that an element has with other elements, wherein each element relationship models the relationship between the associated code or data construct and other code or data constructs represented by the related elements. The Element Discovery Function will generally create a group of elements that may then be stored within the Element Inventory 102, and which then becomes available as part of the system knowledge base to manage the associated code and data components.

A wide variety of vendor tools are available to perform Element Discovery Functions 142. For example, the Fulcrum tool commercially available from the RMC Corporation is capable of analyzing Cobol code constructs and related data structures. This tool must be synchronized with the element types included within a model and stored within the Element Inventory Schema 103. This synchronization allows Fulcrum to create elements having recognized element types and relationship types, and that are consistent with other element types used within the system. Many other types of tools are available for analyzing code and data constructs of various other types of software languages. The type of Element Discovery Functions 142 that are available within a given Object Management System 100 will vary depending on the types of IT functions and technologies that are supported by that system.

Once elements and element relationships are created and recorded within the Element Inventory 102, the related code and data entities can be managed, and become available as potential building blocks to form larger applications. Element Locator 124 can be used to locate groups of elements associated with a particular application or applications so that one or more of the Mission-Specific Facilities can be performed on the element group. The identified elements may then be provided to the Element Packager 118 to be packaged prior to being operated on by the Modernization Facilities 116 in the manner discussed above. Element Locator 124 operates using the technology and application domain mappings that will be described in detail below.

The system further includes several element view functions shown collectively as Element Viewers 144. Element Viewers allow a user to see the elements and element relationships that are stored within Element Inventory 102, and in some cases may be used to create new relationships between existing elements. Four main view functions, or "views", are provided by the Element Viewers 144. The first view, which provides the default view of Object Management System 100, is the Element Explorer View. This view informs the user of the elements/element type matchings. (For example, the view will inform a user that an element is of the element type "TableColumn", "Table", or "Program".) This view allows a user to specify a particular element type as defined within the EIS 103, and in response, provides a list of all of the elements stored within the Element Inventory 102 that are of the type specified. This view further allows a user to create a new element using a selected element type. When a new element is created, memory is allocated within Element Inventory 102. The user can then manually enter the meta-data that will be stored in the new element. For example, the user may enter vendor information or system location information associated code, data, or system components, and may manually enter the relationship information that will relate the newly-created element to other elements. Element creation will be discussed further below.

From the default Element Explorer View, the user is able to select one of the other views, including the Properties View, Relationships View, or Affinity View. The Properties View enables the user to view the list of attributes associated with a selected element or element type, and which are stored within the Element Inventory 102. Attributes provide additional information about the code and data module associated with, and described by, the selected element. The Relationships View is a graphic illustration of the relationships existing between a selected element and other elements, or between a selected element type and other element types. This view further allows a user to create new relationships for that element. This will be described further below. In comparison to the Relationships View, the Affinity View provides a more distant view of a chain of related elements. The Affinity View takes as input a user-provided starting element or element type and an ending element or element type, and displays the starting element, the ending element, and all elements and element relationships which provide the chain, or "slice" of interconnections leading from the starting element to the ending element. A similar view is provided between a specified starting element type and a specified ending element type. The relationships which are provided in these views represent relationships between software constructs that are managed by the Object Management System.

Workbench 111 further provides Administration Functions 146 to administer the Element Inventory.

Object Management System Subsystems and Interfaces

Figure 2B:
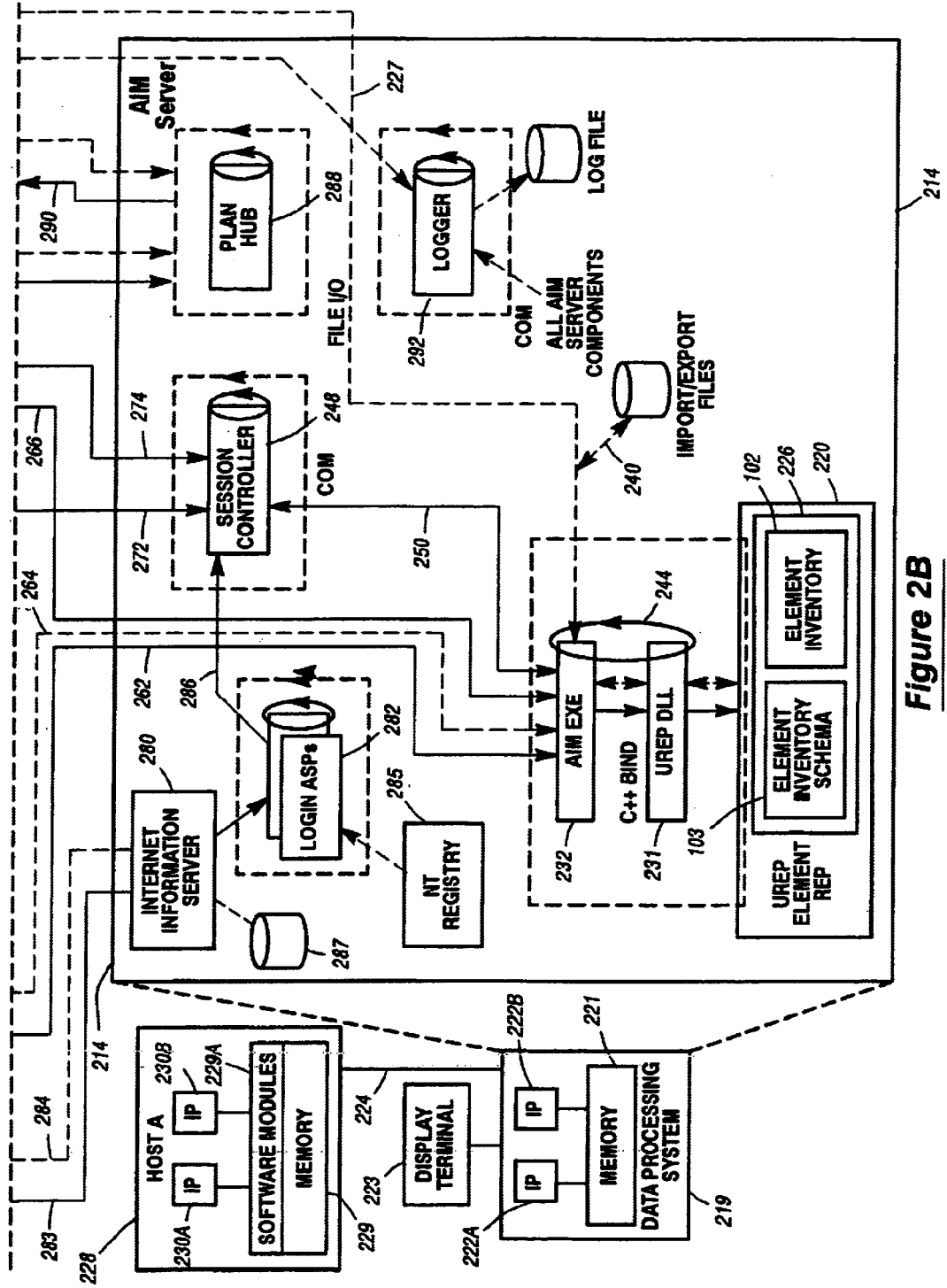

FIGS. 2A and 2B, when arranged as shown in FIG. 2, are a block diagram of the preferred embodiment of the Object Management System within which the current invention operates. In this diagram, process control flow is represented by a solid arrow, and data flow is represented by a dashed arrow, as shown by control flow indicator 202 and data flow indicator 204, respectively. It may be noted that in FIG. 2, any of the dashed arrows representing data flow indicators are implemented as network interconnections. A dashed box with an arrow represents a process, and a dashed box with a double arrow represents a replicated process, as shown by process and replicated process indicators 206 and 208, respectively. A solid loop with an arrow represents a thread, and a solid loop with a double arrow represents a replicated thread, as shown by thread and replicated thread indicators 210 and 212, respectively.

The functionality embodied within Object Management System can be physically divided into three servers, the Asset Inventory Manager (AIM) Server 214, the Client Server 216, and the Script Server 218. The AIM Server 214 supports the Element Inventory 102, Inventory Administration 104, the Asset Inventory Manager 106, the Mission-Specific Facilities 108, and the Common Facilities 110 shown in FIG. 1. The Client Server provides the user interface to AIM Server 214, and supports the Common Workbench 111 of FIG. 1. Finally, the Script Server 218 supports execution of various scripts that are used to execute the scripted protocols, processes, and plans described above in reference to Process Manager 126.

The software constructs shown as AIM Server 214 reside on a data processing system such as that shown in FIG. 2 as Data Processing System 219. Data Processing System 219 includes Memory 221 intercoupled to one or more Instruction Processors (IPs) shown as IP 222A and IP 222B. Data Processing System 219 has one or more user interfaces such as Display Terminal 223. Client Server 216 and Script Server 218 may reside on the same Data Processing System 219, or on similar data processing systems (not shown) intercoupled to Data Processing System 219 via network interconnections. In an alternatively embodiment, Object Management System has multiple Client Servers 216 and multiple Script Servers 218.

The AIM Server

AIM Server 214 includes Element Repository (ER) 220, which is the repository that stores and manages persistent objects (elements). ER 220 may be implemented across multiple hosts interconnected by a remote interface. In the preferred embodiment shown in FIG. 2, the ER is implemented using the Unisys Universal Repository (UREP) commercially available from the Unisys Corporation, although other types of repositories could be utilized including, but not limited to, a Microsoft Repository commercially available from the Microsoft Corporation. Unisys Universal Repository (UREP) is a fully object-oriented repository for providing access to, concurrent sharing of, and immediate update support of all objects stored within the repository. For more information on the UREP system from Unisys, see the UREP Technical Overview, Document Number 8807 6971-000 available from the Unisys Corporation, and which is incorporated herein by reference in its entirety.

In the preferred embodiment, the Element Repository 220 is loaded with the Element Repository Model (ERM) 226. The ERM is an object model which defines objects within ER 220 used to store the element types, relationship types, elements, and relationships.

Within the ERM, the model that defines the various element types is called the Element Inventory Schema (EIS) 103, as discussed above. This model is installed in the Element Repository at system installation time, but may be varied throughout the life of the system. The model definition may be specific to a particular Object Management System. The Element type definitions within EIS 103 provide the templates used during element creation, and define the type of information contained in, the attributes associated with, and the relationships existing between, the elements.

In addition to the EIS, the ERM further contains the Element Inventory 102. The Element Inventory, which is discussed above in reference to FIG. 1, is the collection of elements, each of which is an object storing meta-data about other code, data, or system entities residing elsewhere. This meta-data describes, either directly or indirectly, where the respective entity resides (for example, which directory and server stores the entity). It may be remembered that numerous network interconnections exist within the current Object Management System, and each are depicted by an instance of data flow indicators 204. Any of these network interconnections may interface to another server storing code, data, or system modules represented by the elements stored in Element Inventory 102. For example, FIG. 2 shows a network interconnection represented by Line 224 connecting a Host A 228 to Data Processing System 219. Host A 228 includes Memory 229 which stores code and data modules shown as Software Modules 229A. Memory 229 is interconnected to one or more IPs shown as IP 230A and IP230B for executing instructions, and for aiding in the development of, and the execution of, any of the code and/or data modules. Multiple hosts of the type represented by Host A 228 may be interconnected to Object Management System 100 so that data, code or system modules developed and stored on the host may be managed and cataloged by Object Management System. Alternatively, a host such as Host A 228 that is managed by Object Management System 100 need not be interconnected to Object Management System 100. In that case, any information exchange being conducted between the two systems would occur via a tangible medium (such as by tapes.)

The meta-data included in each of the elements of Element Inventory 102 further describes the relationships an element has with other elements. As discussed above, these relationships model the relationships the associated data, code or system module has with other modules. In the preferred embodiment, the types of meta-data stored within a particular element, as well as the types of relationships that may be created for a particular element, are dictated by the element type associated with the element. The definitions for element types are stored within the model in the EIS 103. This is discussed in detail below.

The Element Repository is accessed using the UREP Dynamic Link Library (DLL) 231. This DLL provides programmatic access to objects stored in ER 220, including objects of ERM 226.

The UREP DLL 231 interfaces with the Asset Inventory Manager Executable (AIM EXE) 232. The AIM EXE implements the Asset Inventory Manager 106 function of FIG. 1. As discussed above, one of the functions of the AIM EXE 232 is to provide an interface to the Element Repository 220 that hides the underlying repository implementation. For example, the services provided by the AIM EXE hide the functions provided by the UREP DLL 231. The AIM EXE further masks the user from any transaction management and database locking that is required to accomplish a given task. The AIM EXE does so by providing an Application Program Interface (API) that supports the operations required by the entities accessing the various elements stored within the Element Inventory 102.

The following services are provided by the AIM EXE. Various ones of these services are called by the Element Discovery Functions 142, and Element Viewers 144 to perform the tasks discussed above. Additionally, various ones of these services may be invoked by a script executing on the script server, wherein the script is formed using protocols, processes, and plans in a manner to be discussed below. In this case, the AIM EXE responds as one of the scripted tools to be discussed in reference to the detailed description of the invention.

Connect: This service connects the session to the Element Repository. This service further opens the repository, makes a repository log entry in the newly created object, and begins a UREP session.

Disconnect: This service disconnects the session from the Element Repository. In the preferred embodiment, this is accomplished by ending the UREP session and closing the repository. This service is called with a parameter that indicates whether uncommitted changes should be discarded. If uncommitted changes exist which are not to be discarded, the request for this service is disregarded.

Export Element Types: This service reads element types from the EIS 103 and writes them into a file in a predetermined format as shown by dashed line 227. In the preferred embodiment, this format is XML. This service is called by scripts which execute on the Script Server 218.

Import Element Types: This service reads element types from a file and writes them into the EIS 103 in a predetermined format, which in the preferred embodiment is AL format, and is shown by dashed line 227. This service is called by scripts that execute on the Script Server 218. The element types are installed at initialization time, and may be updated as desired during the life of a system.

Get Element Types: This service reads element types from the EIS 103 and returns them to the caller in an output parameter. In the preferred embodiment, the output format is Put Element Types: This service reads element types from an input parameter and writes them to the EIS 103. In the preferred embodiment, the input format is XML.

Export Elements: This service reads elements from the Element Inventory 102 and writes them into a file as is indicated by dashed line 240. This service is called by scripts executing on either the Client Server 216 or the Script Server 218.

Import Elements: A service which reads elements from a file and writes them into the Element Inventory 102 as indicated by dashed line 240. This service includes options for handling already-existing elements, including the Ignore, Overwrite, and Create New Version options. This service is called by scripts executing on either the Client Server 216 or the Script Server 218.

Get Elements: A service that reads elements from the Element Inventory 102 and returns them to the caller in an output parameter. This service is called by various ones of the Interactive Tools 259. The element that is to be retrieved may be specified according to an element name, or may be specified using relationship data used to address a particular element within the Element Inventory. Another option for this service allows an element to be specified for retrieval according to a particular character string that the element stores. This can be invoked via a script call.

Get Element for Update: A service called by various ones of the Interactive Tools. This service sets an update lock on an element for a particular session, then reads the selected element from the Element Inventory 102 so that it is returned to the requester as an output parameter. The selected element may be specified by element name, or may be specified using relationship data used to address an element within the Element Inventory. Another option allows the selected element to be specified according to particular character string that the element stores.

Create Elements: A service called by the Interactive Tools, and that provides elements as input parameters so that they can be written to the Element Inventory 102. This can be invoked via a script call.

Update Element: A service called by the Interactive Tools 259 for providing elements as input parameters so that they can be written to the Element Inventory 102. This service must be preceded by a call to "Get Element for Update" service.

Delete Elements: A service called by the Interactive Tools 259 that deletes specified elements from the Element Inventory 102.

Get BLOB: A service called by Interactive Tools 259 which reads a Binary Large Object (BLOB) attribute from an Element in the Element Inventory 102 and writes it into a file. The file can reside on a remote host, specified by a Universal Naming Convention (UNC) name.

Get BLOB for Update: A service called by Interactive Tools which sets an update lock for this session on a BLOB Element in the Element Inventory 102, reads its BLOB attribute, and writes the BLOB attribute into a file. The file can be on a remote host, specified by UNC name.

Update BLOB: This service, which is called by the Interactive Tools, reads a BLOB from a file, and writes the BLOB as an attribute of a BLOB Element in the Element Repository 102. The file can be on a remote host, specified by UNC name. This service call must be preceded by Get BLOB for Update.

Save: A service which commits all uncommitted changes to the Element Inventory 102. When invoked from interactive session, this service also saves a description of the state of the Common Workbench 111, including the state for any executing Interactive Tools.

Undo Last: A service that rolls back the last uncommitted change to the Element Inventory 102. This service may be called by either Interactive Tools 259 or by scripts.

Undo All: This service rolls back all uncommitted changes to the Inventory, if any such uncommitted changes exist. This service may be called by either the Interactive Tools 259 or scripts.

An instance of the AIM EXE 232 is created for each session that is active on the AIM server. If multiple sessions are active, multiple instances of the AIM EXE will be active at once. This is indicated by the replicated process indicator 244.

Creation of the AIM EXE 232 is performed by the Session Controller 248 as is indicated by control flow indicator 250. Creation of the AIM EXE invokes the "Connect" service to establish a session with the Element Repository 220. A session is ended when the Session Controller 248 calls the AIM EXE "Disconnect" service.

In the preferred embodiment, the Session Controller 248 is an NT service that is started automatically at AIM Server boot-up or manually by the administrator. The Session Controller is responsible for generating begin and end session requests in response to user requests received from Application Main 271 to log in and log off the Object Management System, respectively. These requests are represented by control flow indicator 272. Such requests may also be received by the Session Controller 248 from script execution on Script Engine 273, as shown by control flow indicator 274. The Session Controller is also responsible for receiving administrator requests to terminate orphaned sessions by destroying orphaned COM objects.

The browser-level client interface to AIM Server 214 is provided by the Internet Information Server (IIS) 280. In the preferred embodiment, IIS 280 responds to requests from Web Browser 281 by delivering login Active Server Pages (ASPs) 282 to the user for allowing login functions to be performed. The requests are represented by control flow indicator 283, and the IIS responses are represented by data flow indicator 284. IIS returns an HTML page which displays the names of the Object Management Systems if more than one system is available to the user, and further directs the user to the URL of the selected login form ASP. The URLs for the login form ASP is obtained from NT Registry 285, which stores system persistent data such as system names and ASP URLs that cannot, or should not, be held in the Element Repository 220.

A login form ASP returns an HTML page to the client. This ASP contains a form in which the user enters login information such as a user id and password. The user is then directed to the Login Request ASP, which sends the entered information to the Session Controller 248 for validation, as shown by control flow indicator 286. If a session is not successfully created for the user, an HTML page is returned to the client requesting that the information be reentered. Otherwise, a session is established.

Once a user is logged in, the client-side application files for the Object Management System are downloaded from Mass Storage 287 to the Client Server 216, and Application Main 271 on Client Server begins execution. Thereafter, further communication between Client 216 and AIM Server 214 is performed via the Session Controller 248 using Distributed Component Object Module (DCOM) protocol, as shown by control flow indicator 272.

The AIM Server 214 further includes Plan Hub 288, which acts as a central router for script execution requests and script execution status. The Plan Hub receives requests for script execution from the Client Server 216, and forwards these requests to a specified Script Controller 289, which is the process executing on Script Server 218. These requests are represented by control flow indicator 290. As an NT service, the Plan Hub process is started automatically when the AIM Server is booted, and may also be started manually by a system administrator.

AIM Server 214 also includes Logger 292, which is an NT service that receives script execution status from Script Controller 289 so that this status can be recorded.

Client Server

Turning now to a description of the Client Server 216, a user establishes a session with the AIM Server by invoking the URLs of Login ASPs using Web Browser 281. The user receives HTML login pages and application files from IIS 280. Once a user is logged in and a session is established for the user, communication between client and server is via DCOM, although the browser session is maintained.

Application Main 271 is the main client-side process supporting the object management functions. As an executable, the process for Application Main is started at creation. Application Main provides for the start-up of the individual Interactive Tools 259 via the interface shown as Line 260. Application Main further has access to ones of the global services such as Save, Undo, and Logoff, which are provided by the AIM EXE 232.

Invocation of Interactive Tools 259 by Application Main starts each of the Interactive Tools at its logical starting point. These tools call services provided by the AIM EXE to perform functions such as retrieving element type definitions from the EIS 103, retrieving element data from the Element Inventory 102, making requests for the creation of new elements according to the EIS model, or making requests to modify existing elements. These requests are shown in FIG. 2 as Control Flow Indicator 262 and Data Flow Indicator 264. A new thread is started when one of the Interactive Tools 259 begins communicating with the AIM EXE 232. When a request from Interactive Tools 259 is processed successfully by AIM EXE, notification of changes to data in the ER 220 is returned by the AIM EXE 232 via Session Controller 248 to Application Main 271, which then forwards the notification to Interactive Tools 259 via the interface shown as Line 260. One of the Interactive Tools to be described in more detail below is the Plan Wizard 265.

Script Server

The AIM EXE 232 further communicates with Script Server 218. Within Script Server 218, Script Controller 289 accepts requests from the Plan Hub 288 to execute a Plan such that a scripted tool will be programmatically invoked, as will be described in detail below. In response, the Script Controller reads a requested scripted plan, which is stored as an element in the Element Inventory 102. Thereafter, Script Controller controls execution of the scripted plan by Script Engine 273, as indicated by Line 275. The Script Controller further sends periodic notifications to the Plan Hub 288 to report on the script execution status. Upon termination of the script, the Plan Hub writes an element that is a Plan Execution Record to the Element Inventory 102 which records the completion status and includes information necessary for version control.

Structure of the Element Inventory Schema and Element Inventory

Before the use of protocols, processes, and plans can be understood, a brief explanation of the structure of the Element Inventory Schema 103 and the Element Inventory 102 is needed.

Figure 3:
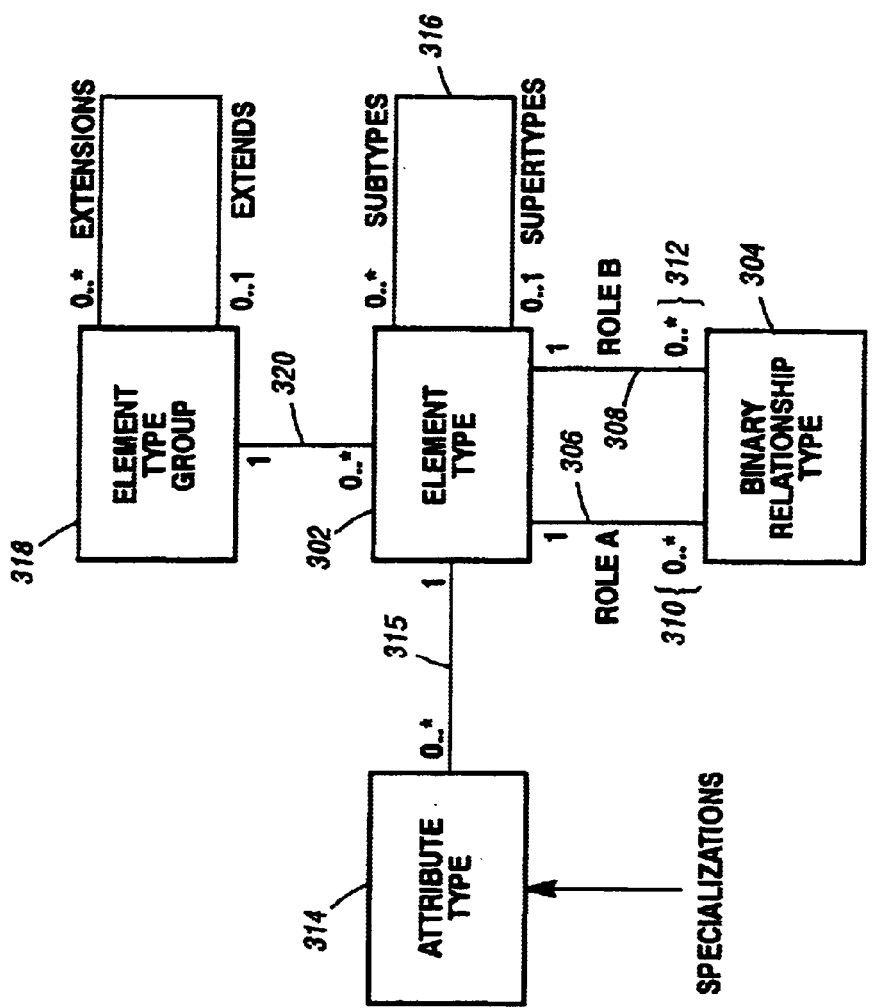
FIG. 3 is a block diagram of the generalized model for the Element Inventory Schema (EIS)

FIG. 3 is a block diagram of the generalized model for the Element Inventory Schema (EIS). As discussed above, the preferred embodiment of the Object Management System 100 utilizes a model loaded within EIS 103 which includes the element type definitions as represented by Element Type 302. Each element type may represent a particular type of software construct or data structure for a code or data module existing within one of the host systems interconnected to Object Management System 100. Examples of element types include "table", "program", "database", "application", and "transaction management system". As many element types may be defined as is necessary to support a given mission of the data processing systems that are managed by Object Management System 100. Generally, a set of element types will be loaded when the Object Management System is initialized. The model is flexible, and may be updated during the life of the system using service calls to the AIM EXE 232 such as "Put Element Types" and "Import Element Types".

Each element type has a predefined Binary Relationship Type 304 with one or more other element types. For example, an element type of "table" has a binary relationship type with an element of type "column". This relationship represents the fact that an element of type "table" may be created within Element Inventory 102 to represent a data module existing on one of the host systems interconnected to the Object Management System 100. The actual table may include one or more columns, and each of these columns will be represented by other elements of type "column" that are also stored in the Element Inventory 102. To restate, each element type 302 represents a type of a potentially reusable code, data, or system module located on various host systems managed by Object Management System 100. The relationship types which exist between element types represent various relationship types that exist between the reusable code, data, and system modules.

In addition to element types that are defined to represent code and data modules, System element types including "protocols", "processes", and "plans" are defined in the EIS 103 for use in supporting the development, deployment, and tracking of scripts used to aid in the management of the elements stored in Element Inventory 102. This will be discussed in detail below.

Returning to the above example, it may be said an element type of "table" has a Binary Relationship Type 304 of "includes" with an element type of "column". Looking at the relationship from another viewpoint, it may be said an element of type "column" is "included by" an element of type "table". Thus "includes" and "included by" defines the roleA and roleB associated with the relationship between table elements and column elements, as is represented by lines 306 and 308, respectively. A given element type may be associated with zero or more relationships of a particular Binary Relationship Type 304. This is indicated by vectors 310 and 312.

An Element Type 302 may each be associated with one or more Attribute Types such as Attribute Type 314, as is represented by Line 315. An Attribute Type is a type of fact that may be stored about an element. "Comment" or "Data type" is an example of attribute types. More than one attribute type may be stored for a given element type.

The element type definitions are hierarchical. A given element type may include element sub-types below it in the element hierarchy, and may be included within an element super-type that is above it in the hierarchy. For example, an element type "Information System Tool" could include sub-types such as "compiler". Element super-types for "Information System Tool" could be "Tool" generally. Element types each inherits the defined attribute types associated with the super-type immediately above it in the hierarchy. This includes the ability to form the relationship types that the super-type was capable of forming. The definitional hierarchy implemented by subtypes and super-types is represented by line 316.

Multiple element types may be grouped into categories, each of which is referred to as an Element Type Group 318. This grouping is represented by line 320. In the preferred embodiment, three Element Type Groups exist: an Asset Element Type Group, a Locator Element Type Group, and a System Element Type Group. The Asset Element Type Group includes all element types that define elements that represent code, data, or system components, for example, the elements that model code, data, or system components stored on Host A 228. The Locator Element Type Group includes all element types that define elements that store the various tasks or applications that are performed by the code, data and system components represented by the Asset Elements, as is described in the co-pending application entitled "An Object Management System Supporting the Use of Application Domain Knowledge Mapped to Technology Domain Knowledge" referenced above. The System Element Type Group includes all element types that define the elements that contain meta-data about the tool set of the Object Management System. For example, elements of this type will store meta-data describing the various relationships, and the locations of, the tools shown in FIG. 1 as Mission-Specific Facilities 108 and Common Facilities 110. System element types also include those types needed to support scripted tool invocation to be discussed below.

In the preferred embodiment, each of the definitions in FIG. 3, including Element Type 302, Binary Relationship Type 304, Attribute Type 314, and Element Type Group 318, are stored as objects within Element Repository 220. Element Repository provides a permanent, recoverable definition object stored in persistent storage (e.g., on disk) for each of these entities.

Figure 4:
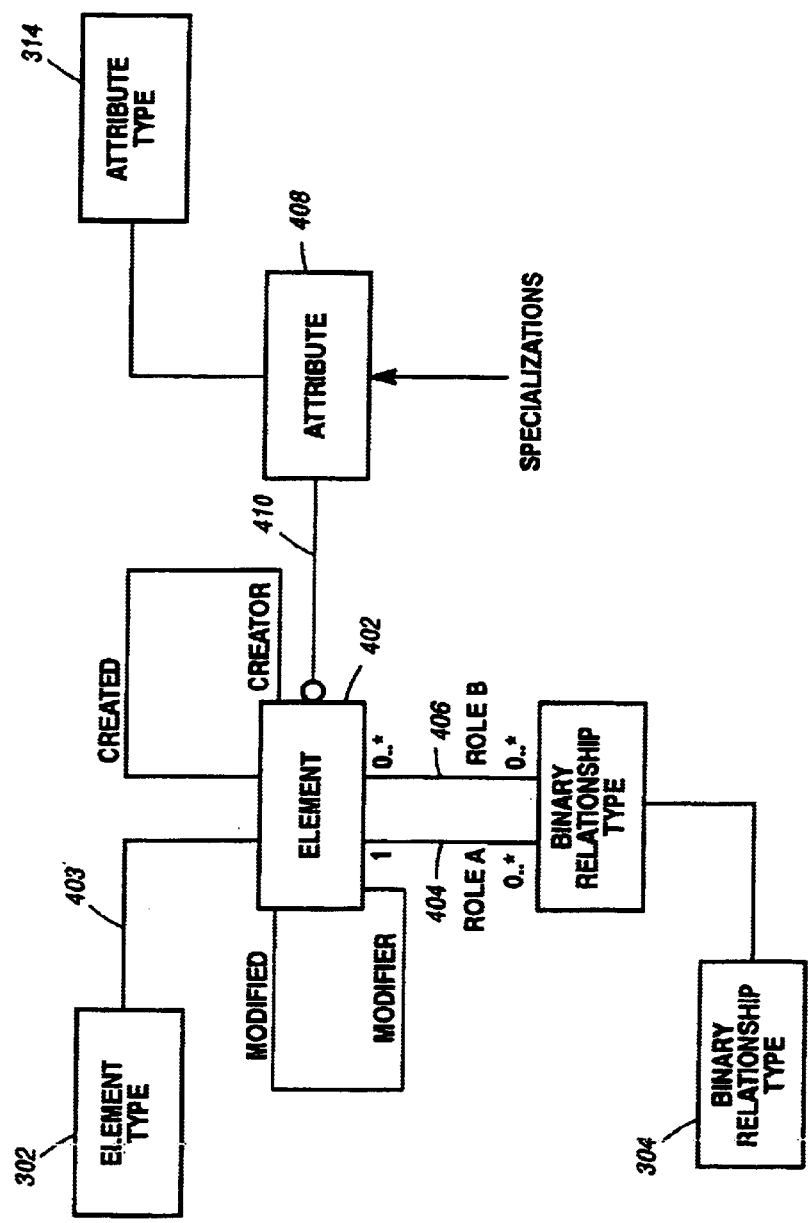
FIG. 4 is a block diagram showing the relationship between instances of elements and relationships, and the various type definitions provided in the model stored in the Element Inventory Schema.

FIG. 4 is a block diagram showing the relationship between instances of elements and instances of relationships, and the various type definitions provided in the model stored in the Element Inventory Schema. When an element, shown as Element 402, is created or loaded within Element Inventory 102, it is assigned to one of the predefined Element Types 302, as indicated by Line 403. Element 402 may be said to be an instance of that particular Element Type. By virtue of this association, Element 402 acquires the potential to be related to other defined element types according to each predefined Binary Relationship Type 304 that is defined for the Element Type 302, as is shown by Lines 404 and 406. Element 402 also may become associated with an Attribute 408 that is an instance of Attribute Type 314 defined for Element Type 302, as is represented by Line 410.

Element 402 and Attribute 408 are versioned objects, meaning that different versions of these elements may reside within the Element Inventory 102 at a given time. For example, if two versions of a tool exist, two different versions of the associated System element describing that tool will also exist. These two versions may or may not have relationships with different versions of a different element, depending on the interrelationships existing between the code entities within the system. For example, an updated version of a program will be associated with a later element version, which may or may not have the same relationships as the earlier element version. If the updated program version must reference an updated version of a table, for example, the table will further be described by meta-data in a later version of an associated element, and a relationship will be created between these two later versions of elements.

As discussed above and shown in FIG. 4, binary relationships are created between two elements. One manner of representing relationships between elements is by including pointers to the various related elements within the meta-data stored within an element. That is, the element stores a relationship indicator such as a pointer that may be used to address a respectively related element. The relationships may also be stored as objects. Those skilled in the art will recognize that many ways of representing the element relationships exist, such as by storing name indicators identifying the various related elements.

Figure 5:
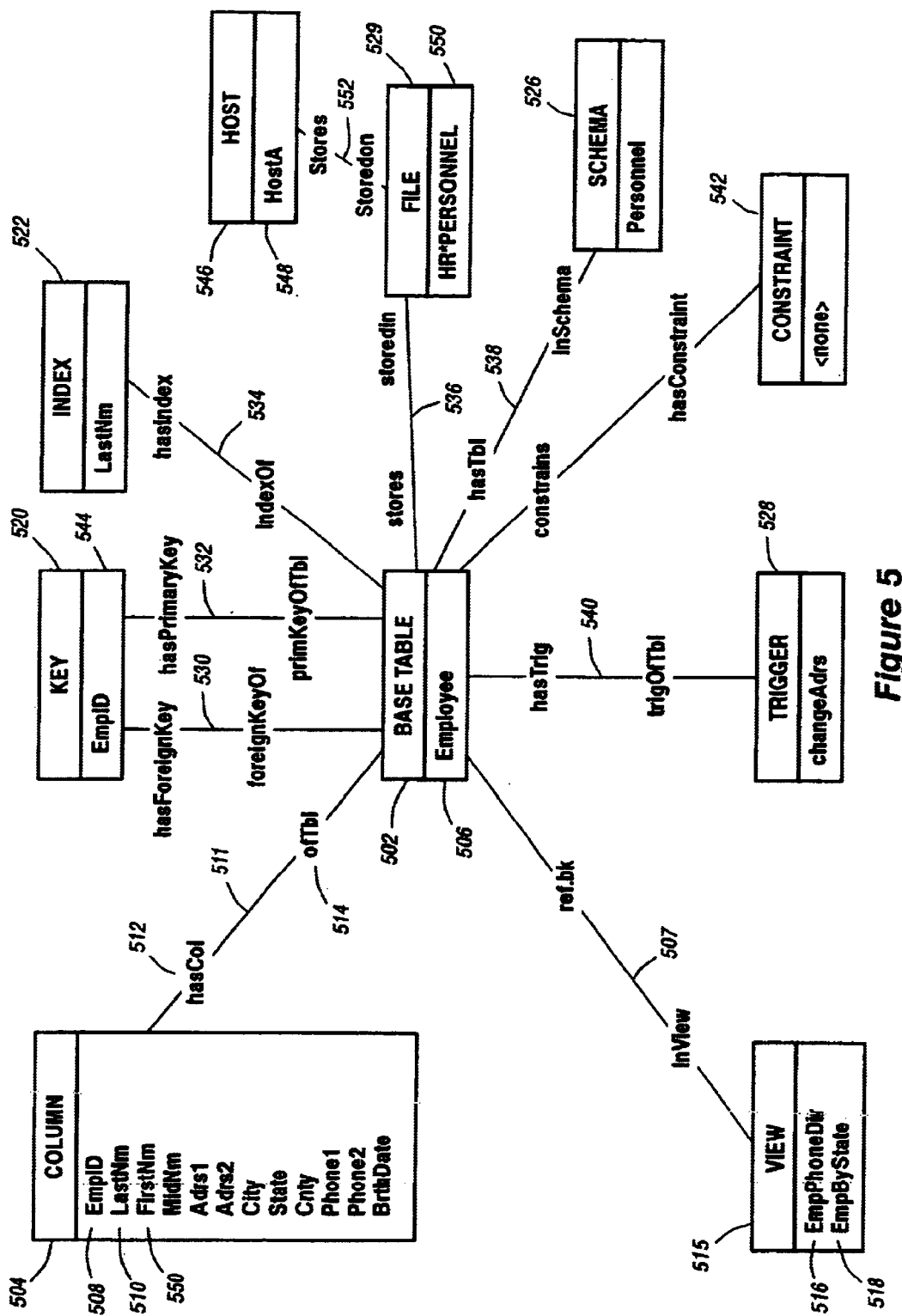
FIG. 5 is a block diagram exemplifying the use of a model to define Asset Elements.

FIG. 5 is a block diagram showing an example of using the element model to define Asset Elements. In this diagram, Asset Element types are listed at the top of each block, and the name of element instances is represented below the element type. For example, this block diagram assumes an Asset Element type of "BaseTable" 502 is defined in EIS 103. This element type has a Binary Relationship Type with the Asset Element type "Column" 504. This represents the fact that a software component which is a table (and which is represented by an element of element type "BaseTable") has (at least one) column. As stated above, the relationships between elements represent relationships between the components described by the elements.

FIG. 5 further depicts that an instance of element type "BaseTable" 502 exists called "Employee" 506. This element is a construct that stores data that describes the actual software module with which it is associated, which in this example is a table. That is, this element represents an actual table of data which exists elsewhere on the system, for example, on Host A 228. This element is assigned the element type of "BaseTable", and is also given a name representing the function provided by the table, which in this case is "Employee". The element further stores an indication of all other elements to which it is related. This actual table may include columns containing information about employees of a business. This is represented by the fact that element "Employee" is related to elements of type "Column" 504 that include elements "EmpID" 508, "LastNm" 510, and the like. These column elements are related to element "Table" through the Binary Relationship Type represent by Line 511, and described by roleA 404 and roleB 406 of "hasCol" 512 and "ofTbl" 514. This represents the relationship between the actual table component, and the individual column components that comprise the table. Hereinafter, for the sake of brevity, instances of binary relationships will be discussed and depicted in terms of either roleA 404 or roleB 406, but not both.

Element type "BaseTable" is shown having various other predefined relationships to other element types including element type "View" 515. Two instances of element type "View" 515 shown as "EmPhoneDir" 516 and "EmpByState" 518 are shown to exist, each having a relationship with element "Employee" 506 represented by Line 507. Other element types related to element type "BaseTable" include "Key" 520, "Index" 522, "File" 529, "Schema" 526, and "Trigger" 528, all of which have Element instances created and stored in the Element Inventory 102 which are related to element Employee 506, as is represented by Lines 530 and 532, 534, 536, 538, and 540, respectively. It may be noted that element type "Constraint" 542 is related to element type "BaseTable". However, for the particular element instance "Employee" of element type "BaseTable", no element instance of type "Constraint" 542 has been created. This demonstrates that the element and relationship type definitions within EIS 103 define potential, not mandatory, relationships which may or may not be established for a given element instance. It may further be noted that more than one type of relationship can be established between an element of a given element type and another element of a second element type. For example, element "Employee" 506 of element type "BaseTable" 502 is capable of establishing the two different types of relationships represented by Lines 530 and 532 with element "EmpID" 544 of element type "Key" 520.

Attributes 408 of a predetermined Attribute Type 314 may be attached to each of the Elements. For example, assume the element type "Column" is related to an attribute type of "DataType" describing the data type of the column data. For a created element instance of element type "Column", meta-data may be stored within the element to describe the data stored within the associated data module containing the column data, and may indicate that data is of type string, long integer, short integer, or character, for example.

For any of the Asset Elements, information is also stored that describes the location of the associated code, data or system component. This information does not necessarily have to be stored within each of the elements, but need only be stored within one of the elements within a group of elements. This can best be understood by returning to the current example. As noted above, it will be assumed element "Employee" 506 represents, and contains meta-data associated with, an actual table existing on one of the servers or host systems associated with the Object Management System 100. Assume this table resides on Host A 228 of FIG. 2. Somehow the location of this table must be recorded within the Element Inventory. This can be done by recording the information directly in each element associated with the table. For example, the server name, directory path, and any other location information could be recorded within element "Employee" 506, and further within all other elements describing the table data, including each and every Column Element shown in FIG. 5. This approach results in duplication of a large amount of data, since multiple elements store the same location information. This data duplication means that more space is required to implement Element Inventory 102, and also means that a change in location of a given code or data module requires changes to many elements.

Instead of storing location information in every element, in the preferred embodiment, the location of the table is only recorded once. This location is stored in a separate element having a dedicated element type. In the current example, this element type is called "Host" 546. An instance of this element type called "Host A" 548 is shown connected to element "HR*PERSONNEL" 550 via a relationship represented by Line 552. Element "Host A" 548 will include the server name and directory path for the file "HR*PERSONNEL" located on Host A228. Further assume that the relationship represented by Line 536 indicates that the file "HR*PERSONNEL" stores a table represented by element "Employee" 506. Because the location of the file is known, by implication the location of the included table is also known, and can be determined by traversing element relationships stored within Element Inventory 102 to find the element of type "Host" 546.

The example of FIG. 5 helps illustrate the modeling approach. A model is stored within the EIS 103 describing potential relationships and attributes for a defined element type. For each element type, element instances may be created having only some, or all, of the predefined relationships. An element instance may have a selectable multiple number of relationships of a given type. For example, BaseTable "Employee" 506 has multiple relationships of the type "hasCol", each with an instance of element type "Column" 504.

At this point, it will be recognized by one skilled in the art that an object management system for managing code and data components could be constructed without the use of a model to define the various elements. For example, the definition of each of the element structures could be stored within the associated element itself without having a separate element definition provided by the model. In this case, however, element management routines would have to employ hard-coded data in the element instances themselves to determined valid relationships for a given type of element. This would make element management more complex and error-prone. This will be discussed further below.

The use of the model in searching the Element Inventory 102 is best shown by example. Assume the model for element type "BaseTable" is stored in the Element Inventory Schema 103. A particular named element within the Element Inventory may be known or is otherwise located. The associated element type for the known element is used to access the element type definition within the model. The model indicates that the subject element type is associated with one or more Binary Relationship Types. For each of these Binary Relationships Types, the meta-data stored within the element is analyzed to determine if any instance of these Binary Relationship Types exists for the particular element instance. If an instance of any of these Binary Relationship Types exists for the element instance, the Binary Relationship instance may be traversed to locate a related element. This process can be made recursive such that each of the identified elements is made the target of the search, and all related elements associated with the target are further identified. Using this method, the element relationships can be traversed to find all elements that are either directly, or indirectly, related to the target element. All relationship traversal is performed using the model definition. This model-based method is particularly useful because it can accommodate the situation wherein new element type definitions are added to the Element Inventory Schema 103, or wherein element type definitions are modified. This modification of element definitions can be accomplished without modifying any of the element management tools.

Figure 6:
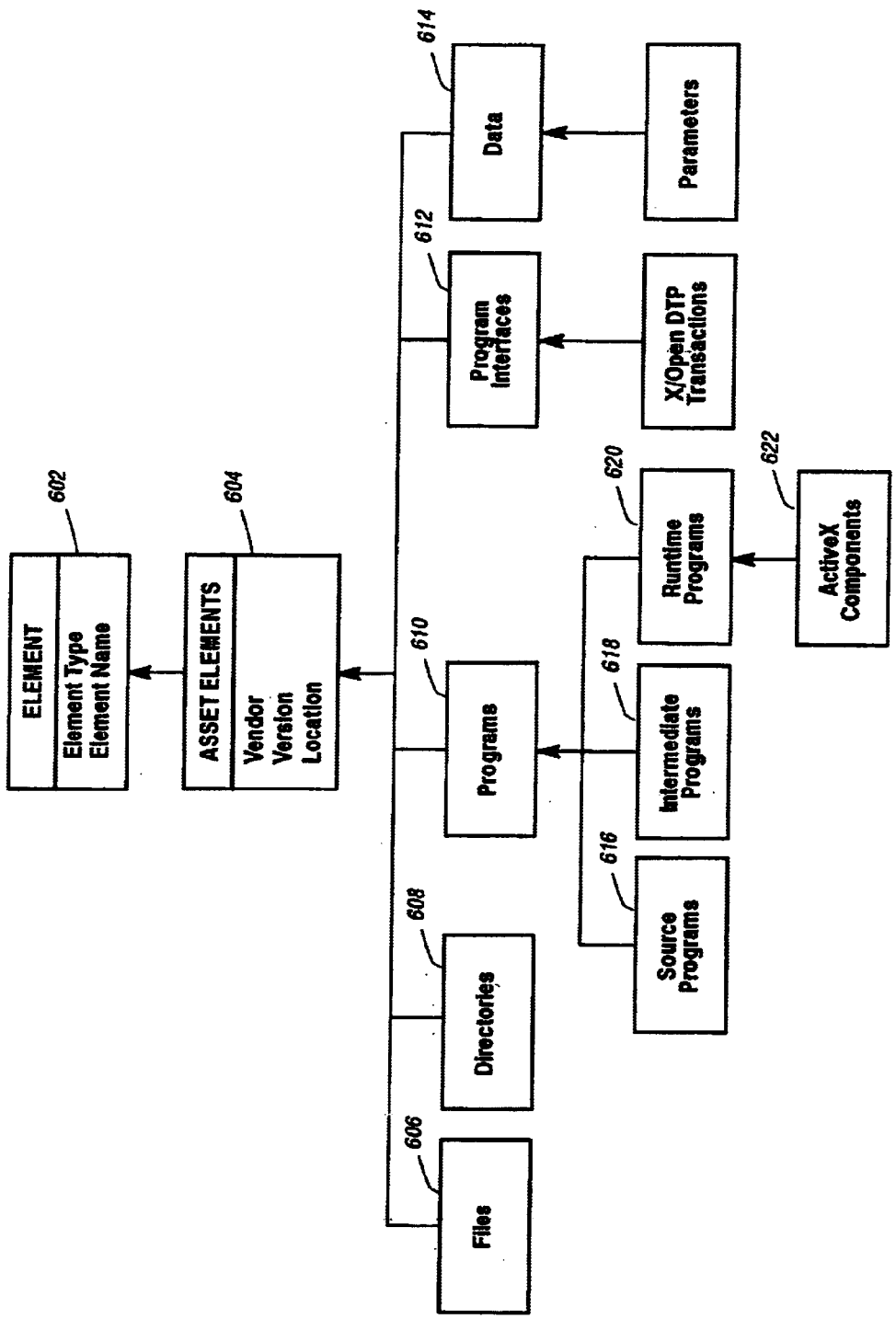
FIG. 6 is a diagram illustrating the hierarchical manner in which elements and element types are defined.

FIG. 6 is a diagram illustrating the hierarchical manner in which elements and element types are defined. As discussed above, a given element type may include element sub-types below it in the element hierarchy, and may be included within an element super-type that is above it in the hierarchy. At the top of the hierarchy is the element type "element" shown in Block 602. Under this element type is shown the element subtype "Asset elements" in Block 604. Other subtypes (not shown) of type "element" include "Locator elements" and "System elements". Many different subtypes are defined for the subtype "Asset elements". For example, all of the element types depicted in FIG. 5 are subtypes of the element type Asset elements. FIG. 6 illustrates some additional Asset element subtypes shown as "files", "directories", "programs", "program interfaces", and "data" in Blocks 606, 608, 610, 612, and 614, respectively. The hierarchy may extend many levels. For example, different subtypes of type "programs" are shown in Blocks 616, 618, and 620, with an additional subtype being shown in Block 622 for the subtype "runtime programs" shown in Block 620.

Each element type may be associated with one or more attribute types, as is discussed above. For example, the type "Asset elements" in Block 604 is shown associated with attribute types "vendor", "version", and "location". When element instances are created, these attribute fields store the meta-data that describes an associated code or data module. For example, the vendor attribute field of an element of element type "programs" could store the vendor name of an associated application program.

As shown in FIG. 6, the definitional structure of the elements in EIS 103 is hierarchical. This hierarchical structure supports the principle of "inheritance". According to this principle, each element type inherits the defined attribute types associated with the super-type immediately above it in the hierarchy, and further inherits the ability to form the relationship types that the super-type is capable of forming. For example, if the element type "programs" in Block 610 can form a relationship type with a particular data type, then all subtypes of "programs" shown in Blocks 616, 618, and 620 (and, in turn, Block 622) can also form this relationship type.

Brief Description of the Interactive Tools
Supported by the Object Management System The relationships existing between the elements can be graphically displayed using several tools, including Element Viewers 144 supported by Object Management System 100. Functionality of these tools are implemented as ones of the Interactive Tools 259. Use of these tools can best be discussed by re-examining FIG. 5. As described above, FIG. 5 shows all of the relationships existing for a particular instance of element type "BaseTable" 502 wherein the element instance is named "Employee". This is the type of graphical display provided by the Relationship View included in the Element Viewers 144 of FIG. 1. This view is obtained by specifying a particular element name, in this case "Employee", as the selected element. Using this view with element "Employee" 506 identified as the selected element, all relationships associated with this selected element are shown as Lines 507, 512, and 530–540. The elements associated with element "Employee" 506 are shown on the periphery of the display interconnected to Lines 507, 512, and 530–540.

Different types of graphical displays can be obtained using other ones of the Element Viewers. The Affinity View allows a user to view a longer "chain" of relationships than can be easily viewed using the Relationship View shown in FIG. 5. For example, the string of relationships starting with element Employee 506 and ending with element HostA 548, or extending even further to include elements related to element HostA can be readily viewed using Affinity View. Alternatively, the Attributes View can be used to obtain a list of attributes associated with a given selected element.

Exemplary Uses of the Object Management System

The functions performed by the Object Management System 100 can best be understood by the following scenarios. Within a data processing system exists code and data modules. A knowledge base may be created to represent these code and data modules. A knowledge base contains the meta-data that describes the code and data components. A knowledge base can be generated with any one of a number of commercially available tools for analyzing code and data structures. These tools are shown as Element Discovery Tools 142 of FIG. 1. For example, the Fulcrum tool commercially-available from the RMC, Ltd., may be used to create an associated knowledge base. These types of tools can be synchronized with the model stored in the EIS 103 to create a knowledge base using Asset elements of the element types defined within the EIS. Element Discovery Tools further create relationships existing between ones of the newly created Asset elements to model relationships existing between the respective code and/or data modules modeled by the Asset elements. These Asset elements and relationships are stored in the Element Inventory 102.

After the Element Inventory is populated, a user may select a group of related elements to be modernized or transformed. This selection may be accomplished using Element Locator in a manner discussed in detail in the co-pending application entitled "An Object Management System Supporting the Use of Application Domain Knowledge Mapped to Technology Domain Knowledge" referenced above. These elements will be packaged using Element Packager 118 as discussed in co-pending application entitled "System and Method for Defining and Managing Reusable Groups of Software Constructs within an Object Management System" referenced above.

Once an element package has been so created, the package may be used to port the associated code and/or data modules defined by the element package to another data processing platform. Alternatively, those code and/or data modules may become the target of renovation operations such as those needed for Year-2000 problems. A still further alternative involves using the package to transform the associated code and/or data modules into another coding language, or to "wrap" those modules with an additional layer of code so that they become accessible from a different data processing environment other than the one on which they resides. For example, a user could use the DGate Ace tool commercially-available from the Unisys Corporation to build a wrapper around the code entry points of enterprise server transaction applications to make those applications callable from within a Microsoft ActiveX environment. Elements and element relationships are created for any newly created code and/or data modules and become part of the existing knowledge base.

Additional operations that may be performed on the code and data modules include such routine operations as compiling, linking, and transferring files.

Using a Process-Based Interface to Support
Software Development, Modernization and
Renovation Operations Performing the above-described tasks, including managing, locating, packaging, transforming, and renovating code, data, and system modules requires the use of a large number of tools provided by any number of vendors. Learning to operate this disparate set of tools could be a large, time-consuming and error-prone task. To simplify this task, the current Object Management System allows some tasks to be process-driven instead of tool-driven. That is, when specifying a particular operation to be performed on one or more elements, the specification is made in terms of the task to be accomplished, and is completely independent of any tool or tool interface which will be invoked to accomplish the task.

The process-based interface utilizes three concepts: Protocols, Processes, and Plans. A Protocol is an entity that stores a scripted invocation of a tool function. For example, a Protocol could be defined to automatically invoke a compiler interface. A Protocol is written generically, with any input parameters and output parameters that are required being specified as variables.

A Process is a supertype, or a more generalized form, of a Protocol that does not directly invoke a scripted tool function, but instead is associated with one or more Protocols, and in some cases other Processes. These one or more associations with Protocols and/or Processes define a task that may be performed on one or more code and/or data modules. For example, a Process could be defined which is associated with both a "compile" and "link" Protocol to define a "compile/link" task. The task definition may include decisional logic statements to handle errors and recovery scenarios. These logic statements may be written in any one of the commercially-available scripting languages as dictated by the type of Script Engine 273 used by Object Management System 100.

Like Protocols, Processes are defined in a generalized manner such that any input and/or output parameters used within a Process is specified within the Process as a variable. That is, a Process does not actually specify which code and/or data modules will be operated on by the task.

A Plan defines a script containing the script statements included in one or more associated Processes, and which further includes specific indications of the code and/or data modules on which the script is to be executed. A script developed from a definition stored in a Plan may be provided directly to Script Engine 273 for execution assuming the correct scripting language has been used.

In the preferred embodiment of the invention, Protocols, Processes, and Plans are defined as System elements, which are objects stored in Element Inventory 102 in a similar manner to the way in which Asset Elements are stored. Furthermore, these System elements are created using element type definitions stored in EIS 103 in a similar manner to the way in which Asset elements are created using Asset element type definitions stored in EIS 103.

Figure 7:
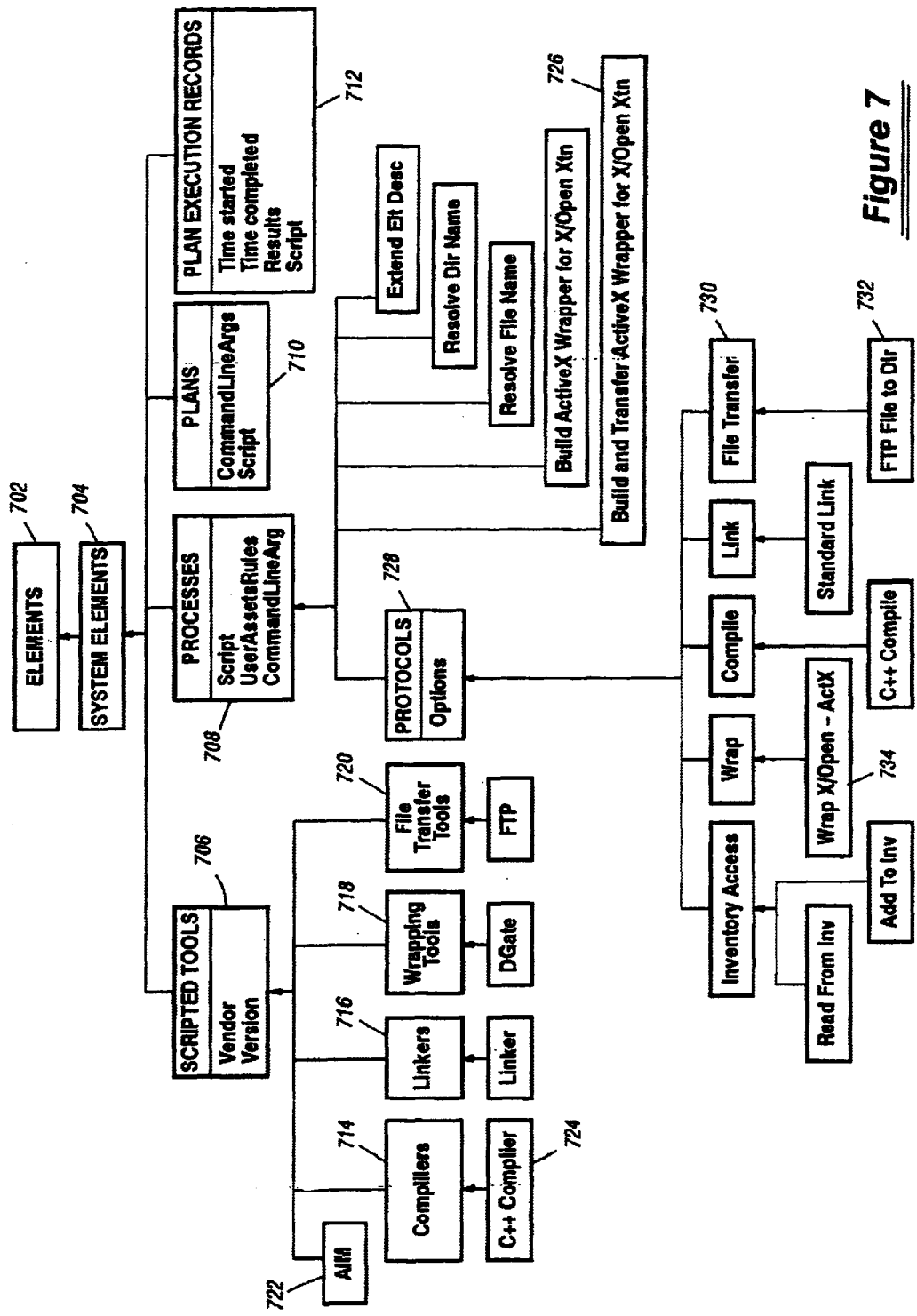
FIG. 7 is a diagram showing the hierarchical definition of System element types within EIS.

FIG. 7 is a diagram showing the hierarchical definition of System element types within EIS 103. This diagram is similar to FIG. 6, showing the hierarchical definition associated with Asset elements. Like FIG. 6, element type "Elements" is at the top of the hierarchy in Block 702. Below this element is defined subtype "System Elements" in Block 704. System element types include "Scripted Tools", "Processes", "Plans", and "Plan Execution Records" shown in Blocks 706, 708, 710, and 712 respectively. Subtypes of "Scripted Tools" include subtypes "Compilers", "Linkers", "Wrapping Tools", and "File Transfer Tools" shown in Blocks 714, 716, 718, and 720 respectively. Another subtype of the type "Scripted Tools" is shown as the "AIM" in Block 722. The scripted AIM functions associated with this subtype include selected functions of the AIM EXE 232 that may be automatically invoked, as discussed above.

In a manner similar to that described above with respect to Asset elements, the element definitions are hierarchical such that element subtypes further include subtypes. For example, subtype "C++ Compiler" in Block 724 is shown as a subtype of "Compilers" in Block 714.

FIG. 7 further shows some of the attribute fields associated with the element type definitions. For example, as shown in Block 708, Processes include a script attribute to be used in storing script language commands in a manner to be described below. Because of the principle of inheritance, Protocols, which are a subtype of the element type processes, also includes the attribute field "Script".

Subtypes are also defined for the element type "Processes" shown in Block 708. These subtypes are used to define operations that can be executed by the Object Management System in a scripted (non-interactive) fashion. For example, the process subtype "Build and Transfer ActiveX Wrapper for X/Open Xtn" in Block 726 is an element type that represents a function that builds an ActiveX wrapper for an X/Open DTP transaction, then copies the wrapper to a selected destination.

Some processes are further specialized as Protocols, as is represented by the element type "Protocols" in Block 728. Protocol subtypes are Processes with the additional characteristic that they directly invoke scripted tools registered with the Object Management System. For example, file transfer protocols might be defined that invoke a scripted tool to transfer code and data modules from one server and/or directory to another, as is represented by the subtype shown in Block 730. An example of such a scripted tool might be one that implements the File Transfer Protocol (FTP), as is indicated by Block 732. Protocols can also be defined to populate the Element Inventory with Asset Elements using discovery tools, or to perform backup, archive, import, and export operations on the Element Inventory. As another example, the Protocol subtype "Wrap XOpen— ActX" in Block 734 represents the function that invokes a scripted tool to generate ActiveX wrapper source code files given a definition of a set of X/Open DTP transactions as input. As will be seen below, Processes (including Protocols) may be combined to form ever more powerful Processes.

In a similar manner as discussed above in reference to Asset elements, relationships can be created between the System element subtypes. Relationships can also be created between System element subtypes and Asset element subtypes. These relationships define how the various element types can interact.

Figure 8:
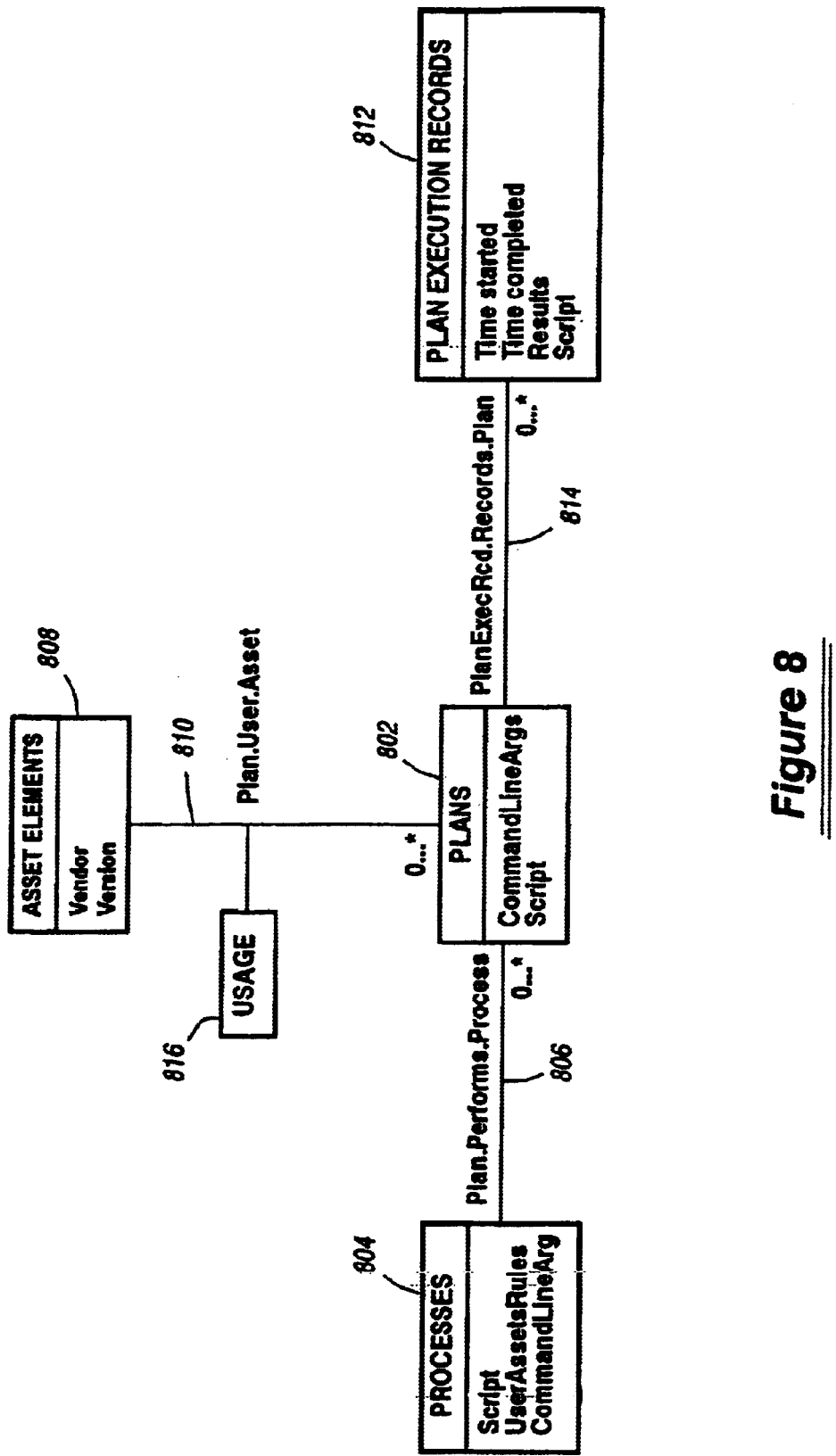
FIG. 8 is a diagram illustrating the various relationship types existing between Asset, Process, and Plan element types within the Element Inventory Schema.

FIG. 8 is a diagram illustrating the various relationship types existing between Asset, Processes, and Plans element types within the Element Inventory Schema. Elements of type "Plans" in Block 802 are said to "perform" elements of type "Processes" shown in Block 804. This is indicated by the Relationship Type "Plan.Performs.Process" at Line 806. Elements of type "Plans" are also said to "use" elements of type "Asset Element" shown in Block 808. This is illustrated by the Relationship Type "Plan.Uses.Asset" at Line 810. Elements of type "Plan Execution Records" in Block 812 are said to "record" elements of type "Plans", as is shown by the Relationship Type "PlanExecRcd.Records.Plan" at Line 814. This recording of Plans will be discussed below.

In a manner which is similar to that described above in reference to element types, the relationship types may be associated with attributes types. For example, FIG. 8 shows the "Usage" attribute in Block 816 associated with the relationship type "Plan.Uses.Asset". This attribute describes the manner in which an Asset element instance may be used by a particular Plan element instance.

Figure 9:
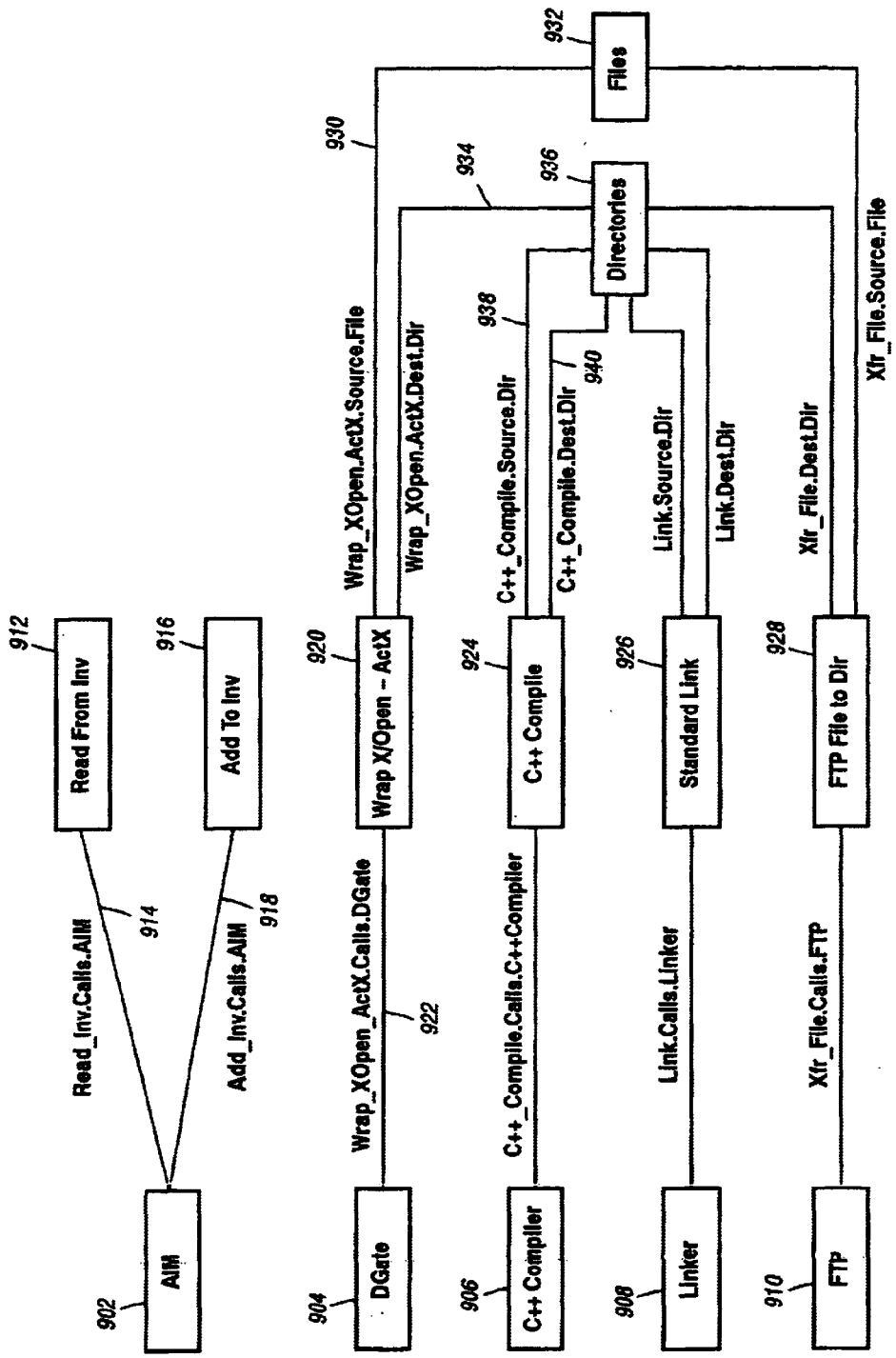
FIG. 9 is a diagram illustrating more specific relationship types that may be defined within the Element Inventory Schema between System element types, and further between ones of the System element types and Asset element types.

FIG. 9 is a diagram illustrating more specific relationship types that may be defined within the Element Inventory Schema 103 between System element types, and further between ones of the System element types and Asset element types. Scripted tool element subtypes are shown as "AIM", "DGate", "C++ Compiler", "Linker" and "FTP" in Blocks 902, 904, 906, 908, and 910 respectively. Each of these scripted tools is related to at least one Protocol element type wherein the relationship is indicative of the particular function being invoked by the Protocol element type. For example, the Protocol element type "Read From Inv" in Block 912 has a relationship of type "Read_Inv.Calls.AIM" shown as Line 914 with AIM element type in Block 902. This relationship type defines a relationship wherein a respective Protocol element created according to this element type calls AIM EXE 232 to read elements from Element Inventory 102. Similarly, Protocol element type "Add To Inv" in Block 916 has a relationship of type "Add_Inv.Calls.AIM" shown on Line 918 the AIM element type, indicating a relationship wherein the respective Protocol element calls AIM EXE 232 to add elements to Element Inventory 102. As another example, the Protocol element subtype "Wrap X/Open—ActX" in Block 920 has a relationship of "Wrap_XOpen_ActX.Calls.DGate" shown by line 922 with element type DGate in Block 904. This indicates that a Protocol element defined as this element type is used to define an automatic invocation of the DGate Ace tool to build an ActiveX wrapper. Other relationships are shown between the various Protocol element types in Blocks 924, 926, and 928, and the respective script tool element types shown in Blocks 906, 908, and 910.

In addition to relating to scripted tool element types, the Protocol element types also relate to Asset element types. For example, Protocol subtype "Wrap X/Open—ActX" in Block 920 has a relationship of "Wrap_XOpen.ActX.Source.File" shown by Line 930 with element type "Files" shown in Block 932, and further has a relationship of "Wrap_XOpen.ActX.Dest.Dir 934 with Asset element type "Directories" shown in Block 936. This indicates that a Protocol that is defined to be of the element type "WrapX/Open—ActX" uses Asset elements of element type "Files" as source, or input, parameters, and further uses Asset elements of element type "Directories" as destination, or output, parameters. The practical implication of these definitions will be discussed below in the examples. It may be noted that Protocol elements do not always operate on Asset elements. For example, the Protocol subtype "Read From Inv" and "Add To Inv" in Blocks 912 and 916, respectively, have no relationship types to Asset element subtypes.

Each of the element types shown in FIG. 9 is stored in EIS 103. Element instances created according to these types are stored in Element Inventory as objects that can be managed and viewed using the same object management tools provided to manage and view Asset elements. Furthermore, these element instances can be written to, and read from, the Element Inventory using AIM EXE 232 functions that are called view Interactive Tools 259, or via the scripted interface functions discussed above. Storing the System element instances as objects therefor makes the Protocol, Process, and Plan entities easy to manage, create, and use.

Figures 10, 10A:
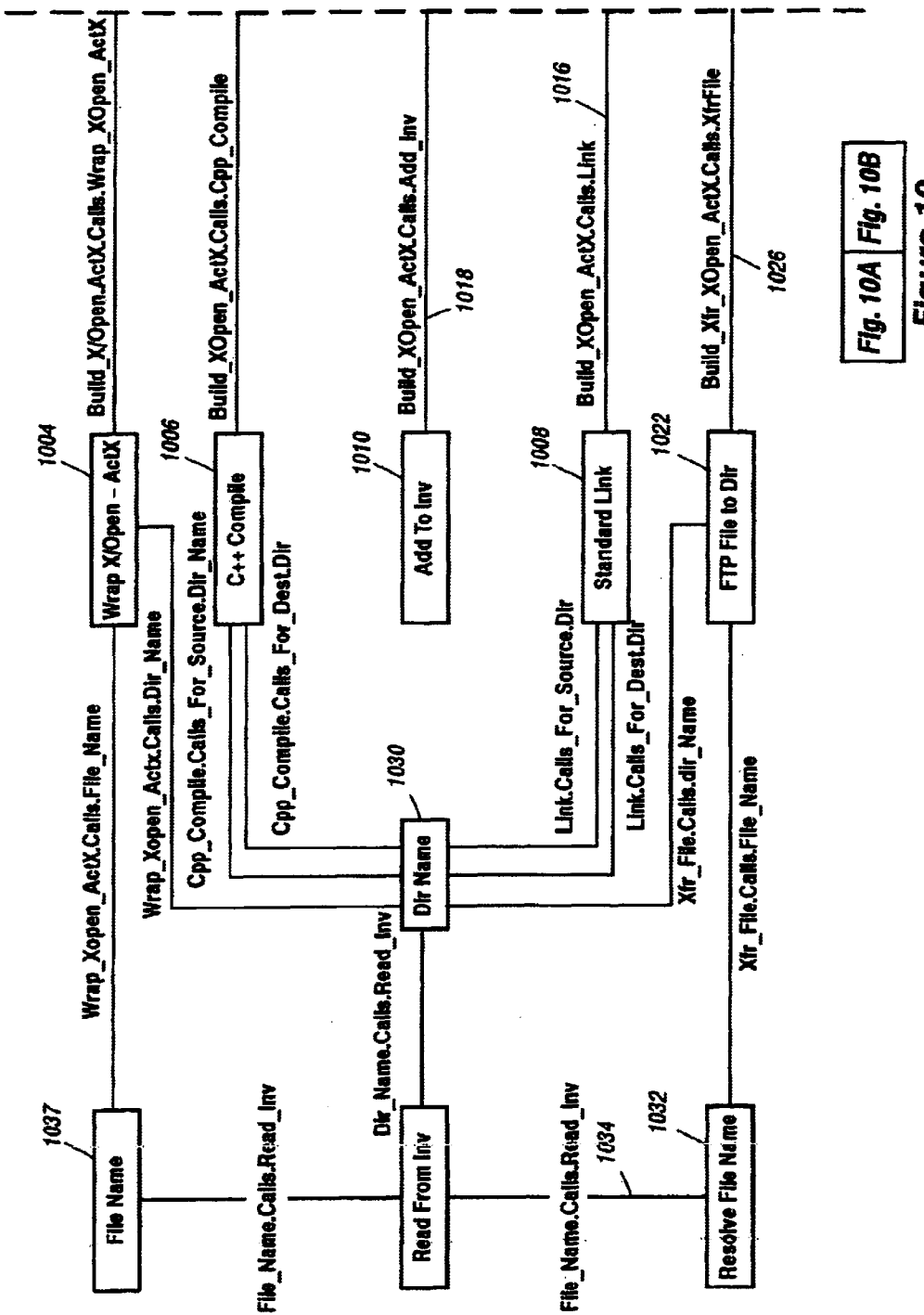
FIG. 10 is a diagram illustrating relationship types defined between various Process element types.
Figure 10B:
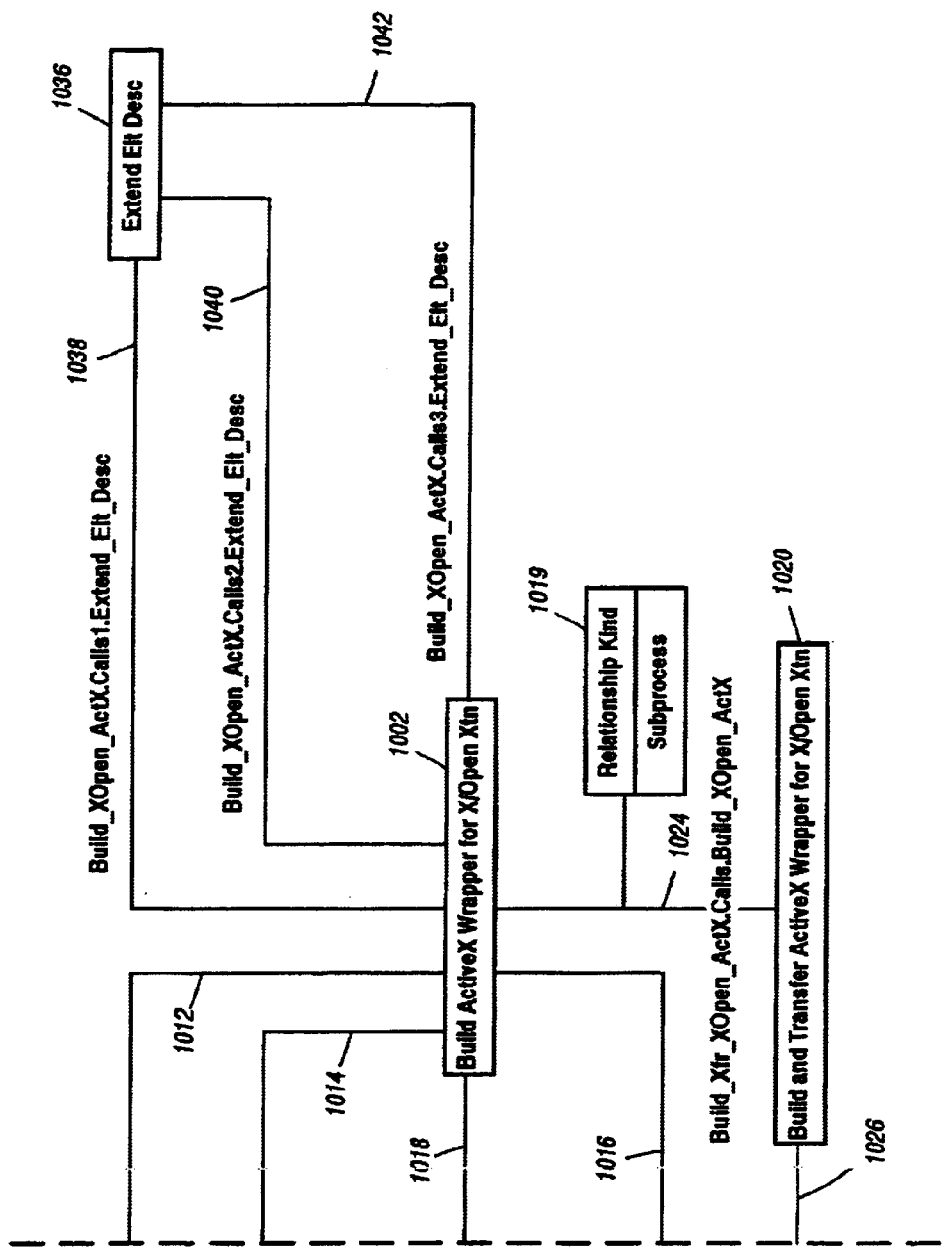

FIG. 10 is a diagram illustrating relationship types defined between various Process element types. As discussed above, Protocols, and even other Processes, can be combined to define more powerful Processes. This combination function is defined using relationships between the various combined entities. For example, the Process element type "Build ActiveX Wrapper for X/Open Xtn" shown in Block 1002 uses four other Processes, including "Wrap X/Open—ActX", "C++ Compile", "Standard Link", and "Add To Inv" shown in Blocks 1004, 1006, 1008, and 1010 respectively. This is seen by the four relationship types associating the element type "Build ActiveX Wrapper for X/Open Xtn" Process with the aforementioned "called" or "used" Processes, which are shown by Lines 1012, 1014, 1016, and 1018, respectively. Relationship types that are used to associate a Process with another sub-process are tagged with an attribute that is called "Relationship Kind", wherein the relationship kind is set to "Sub-process". This is shown in Block 1019.

FIG. 10 further shows the hierarchical nature of the process type definitions. For example, the element type "Build and Transfer ActiveX Wrapper for X/Open Xtn" shown in Block 1020 is defined as "calling", or "using", element types "Build ActiveX Wrapper for X/Open Xtn" and "FTP File to Dir" in Blocks 1002 and 1022, respectively. This is shown by the relationship types indicated by Lines 1024 and 1026, respectively. Practically, this means that an element that is defined to have an element type of "Build and Transfer ActiveX Wrapper for X/Open Xtn" will define a task that when invoked will result in the execution of the tasks defined by the "used" sub-processes. In turn, this will result in the invocation of the functions defined by the Protocols called by the "used" sub-processes. This use of element subtypes in defining other element types is similar to the concept of building software routines through calls to other subroutines.

Other elements represented in FIG. 10 include the Protocol element "Dir Name" in Block 1030. This Protocol may be called by any of the other Protocols to identify a directory name for use during execution of a Plan in a manner that will be discussed below. A similar Protocol shown in Block 1032 as "Resolve File Name" is used to identify a file name for use during execution of a Plan, as will be described below.

Defining Instances of Protocols, Processes, Plans, and Scripted Tool Elements The foregoing discussion describes the various Protocol, Process, and Plan element types and associated relationship types that are defined within EIS 103. Using these element types, element instances are defined within Element Inventory 102. A first portion of the memory within Element Inventory may be dedicated to storing Protocol element instances, a second portion of the memory may be dedicated to storing Process element instances, and a third portion of the memory may be dedicated to storing Plan element instances. These element instances store specific meta-data for the various scripted tools, as well as the specific Protocols, Processes, and Plans that will be used to invoke these scripted tools. The meta-data stored within the element instances is defined using the respective attribute types associated with a given element type. For example, attributes associated with the element type "Scripted Tools" include the vendor and version for a given tool.

Protocol Elements

As discussed above, a element instance that is created to be of element type "Protocol" stores information that indicates how a particular tool is to be programmatically invoked to perform a particular function. For example, an instance of an element of type Protocol could be created that stores a character string such as the following that will be used to invoke a compiler:

"C++ inputfiles -d -o, outputfiles": The portion of the character string "C++" is the actual character string used to programmatically call a particular C++ compiler. When the Protocol is actually processed by Script Engine 273 in a manner to be discussed below, "inputfiles" will be replaced with the input file names. The option "-d" could be a particular option that specifies that the compiler is to be executed in debug mode. The option "-o" means that the next string ("outputfile") will indicate the destination for the resulting object file, which is an intermediate, unlinked file. The character strings "inputfiles" and "outputfiles" are variables. The actual names of input and output files will be substituted in place of these placeholder variables when the Protocol is actually used later to generate a Plan. This will be described further below.

A Protocol element has a name identifier in the manner described above with respect to Asset elements. The name for this Protocol might be "C++ Compiler: in Debug Mode". Another Protocol could be defined for this tool which specifies different options that do not invoke execution in debug mode. This Protocol could be called "C++ Compiler: No Debug", for example.

Other Protocols could be defined to invoke any of the tools that exist within the Interactive Tool DLL. For example, FIG. 8, discussed above, illustrates element types for defining Protocol elements to invoke linkers, wrapping tools, file transfer tools, and even for invoking the functions that allow access to the AIM EXE 232. Other tools that also might be associated with Protocol elements include backup tools used to back up the Element Inventory 102. These tools may also include import facilities that are used to load elements and element types into the Element Repository 220 using file I/O, and export facilities that are used to save a copy of elements and element types from the Element Repository into another storage unit.

The purpose of each of the Protocols is to encapsulate a particular tool invocation, including the specific formats, options, and parameters that are required, so that this becomes transparent to any subsequent user. The Protocols can therefor be used to accomplish a task without a user being aware of any of the details associated with a particular tool. The user does not even have to know which tool is being invoked.

As mentioned above, both Protocols and Processes, which will be discussed below, can be written in any language that can be executed by an appropriate script interpreter engine. These scripts can be written by users with detailed understanding of the tools and the process scheme of the Object Management System. In the preferred embodiment, the following control fields may be included within the script attribute field of Protocols and Processes for use in generating scripts:

&ART&xxxx&: This control field indicates an Asset element assignment. The sub-field "xxxx" is a description of the relationship type from the Process element subtype to the Asset element subtype. At the time a Plan is generated from a Process, this control field is removed.

&NAME&xxxx&: This control field indicates a name, typically for an Asset element created by the Protocol or Process. This control field is removed during Plan creation.

&ATTR&xxxx&: This control field indicates an attribute of the Protocol or Process element, where "xxxx" is the unique identifier of the attribute type. This control field is replaced by the string value stored in the Options attribute of an identified Protocol or Process during Plan creation.

&URT&xxxx&: This control field indicates a Process used by the current Process as a sub-process. The sub-field "xxxx" indicates the unique identifier of the relationship type from the Process element subtype to the sub-process element subtype. During Plan creation, the relationship stored in this control field is navigated to locate the called sub-process elements within the Element Inventory. This control field is then removed from the script.

Additional script language syntax includes the use of the "+" sign, which indicates a string concatenation operation.

The use of the foregoing fields can be best exemplified by illustrating their use in defining the Protocols shown in FIG. 9. These definitions include some pseudo code, which can be written in any language understood by a script interpreter engine. This pseudo code is stored in the Script attribute field within the associated Protocol or Process element instance in the Element Inventory 102. The Protocol definitions shown below include line numbers used for convenience of reference, and which are not included in the actual definitions. Additionally, it will be understood that some commands are longer than can be accommodated by a single line, and therefor extend to a following line as is indicated by indentation of the subsequent lines. These commands are to be read as a concatenation of the characters from the two or more lines.

The following Protocol definition applies to the "Add To Inv" Protocol shown in Block 916 of FIG. 9:

```
ADD_TO_INV(EltDescription)
{
1       DECLARE InvObject ComObject
2       Set InvObject = CreateObject("AIM.INV")
3       InvObject.BeginXtn
4       ADD_TO_INV = InvObject.CreateElement(EltDescription)
5       InvObject.CommitXtn
}
```

The name of the Protocol is "ADD_TO_INV". This name is stored within the Protocol element in the element name attribute field. In addition, the entire illustrated text is stored in the Script attribute field.

Line 1 of the Protocol declares the variable "InvObject" that will be used to reference a COM Object. Line 2 initializes the variable to point to the newly-created COM object that was created using the CreateObject function. Such operations are known in the art. Line 3 starts a transaction using the newly-created COM object. The operation in Line 4 programmatically invokes the AIM EXE 232 using the "Create Elements" function described above in reference to the AIM interface. This AIM function uses the newly-created COM object to create an element in the element inventory having the contents that are passed as the parameter of the function, and shown as "EltDescription". Line 5 ends the transaction associated with the newly-created COM object.

This Protocol allows a user to programmatically invoke the AIM interface to create a new element having the contents that are passed as the parameter of the Protocol.

The following Protocol definition applies to the "Read From Inv" Protocol shown in Block 912 of FIG. 9:

```
READ_Inv(QueryString)
{
1       DECLARE InvObject ComObject
2       Set InvObject = CreateObject("AIM.INV")
3       InvObject.BeginXtn
4       READ_INV = InvObject.GetElements(QueryString)
5       InvObject.AbortXtn
}
```

This Protocol includes functionality that is similar to the "Add To Inv" Protocol discussed above, except this Protocol creates a COM object, then reads the Asset element from Element Inventory 102 using the AIM EXE 232 function "Get Elements". The Asset element that is retrieved is identified by the query string that is passed as the parameter to the Protocol. Other Protocols may be defined to programmatically invoke the AIM EXE interface using the AIM script functions described above.

As described above, Protocols and Processes use the same control fields within the script attributes. The distinction between the two is largely that Protocols directly programmatically invoke a scripted tool, wherein Processes combine Protocols, and sometimes, other processes, to accomplish a larger task. Turning briefly, then, from the above discussion of Protocols, the following Processes are discussed. These Processes provide examples of how decisional logic may be included in both Processes and Protocols to develop a script.

The first Process to be considered is represented as Block 1037 in FIG. 10, and is defined as follows:

```
1   FILE_NAME(FileString)
{
DECLARE ReadInvString String
2   if (FileString isA Uid), then
3       ReadInvString = "Name(" + FileString + ")"
4       FILE_NAME =
            READ_INV&URT&FILE_NAME.CALLS.READ_
            INV&
(ReadInvString)
5   else
6       if(FileString == NULL), then
7           FILE_NAME = Protocol.DefaultFileName
8       else FILE_NAME = FileString
9       endif
10  endif
}
```

This Process, which may be called by the Process shown as 1004 of FIG. 10, is used to resolve the name of a file. During the creation of Plans from Protocols and Processes, specific directory and file names are sometimes needed to retrieve and/or store data. A user will be queried for this information during Plan creation in a manner to be discussed further below. The user can provide this information directly as string input, for example, by typing "FileA". Alternatively, the user can specify an element name that will be used to programmatically retrieve an element from the Element Inventory such that the file name will be read from the specified element. As a third alternative, a default file name can be assigned. The above Process is used to determine which of these alternatives are used, and to ultimately return the file name. More specifically, line 2 above determines by the format of the passed parameter, and in a manner beyond the scope of this invention, whether the specified file name is an element identifier. If it is, the complete element name is generated using string concatenation in line 3, and this name is passed to the Element Inventory using a sub-process call to the "Read From Inv" Protocol in line 4. This sub-process call is specified using the &URT& command field to identify the relationship "File_Name.Calls.Read_ Inv" that exists between the element "Dir Name" and "Read From Inv" (shown as Line 1034 in FIG. 10). If an element identifier is not specified, a specified string can be used as shown in Line 6, or the default name can be used as shown in Line 7. The assigned file name is returned to the calling Protocol.

The above discussion describes the overall functionality associated with the "FILE_NAME" Process. Before moving on, a brief explanation is provided regarding the "URT" command field. This field is used in a manner that is similar to a subroutine call. When a script is built that will be used to execute the "FILE_NAME" process, the relationship identified in the "URT" command field is used to locate another Process or Protocol element in the Element Inventory, wherein the located Process or Protocol provides the "called subroutine". Then the "URT" field is removed from the script, leaving only a function call. More details about this substitution is provided below in reference to script creation for a Plan.

Turning now to the description of the process "Dir Name", which describes the functionality included in the element represented as Block 1030 of FIG. 10, this process is similar to that discussed above in reference to process "File Name" but instead provides the names for directories. This definition is as follows:

```
DIR_NAME(DirString)
{
DECLARE ReadInvString string
    if (DirString isA Uid), then
        ReadInvString = "Name(" + DirString +    ")"
DIR_NAME =
    READ_INV&URT&DIR_NAME.CALLS.READ_INV&
    (ReadInvString)
    else
        if (DirString == NULL), then
            DIR_NAME = Protocol.DefaultDirName
        else DIR_NAME = DirString
        endif
endif
}
```

FIGS. 9 and 10 also include addition Protocols such as the "C++ Compile" Protocol. The following definition defines the Protocol "C++ Compile" shown in Block 924 of FIG. 9:

```
1   C++_COMPILER(
2       &ART&C++_COMPILE.SOURCE.DIR&SourceDir,
3       &ART&C++_COMPILE.DEST.DIR&DestDir)
    4   {DECLARE SourceDirName String
    5   DECLARE DestDirName String
    6   DECLARE Options String
7   SourceDirName                                    =
DIR_NAME&URT&CPP_COMPILE.CALLSFORSRC.DIR_NAME&(
    SourceDir)
8   DestDirName                                      =
DIR_NAME&URT&CPP_COMPILE.CALLSFORDEST.DIR_
NAME&(DestDir)
9   Options = "&ATTR&Options&"
10  EXEC CPP(SourceDirName, DestDirName, Options)
}
```

Line 1 shows the Protocol name "C++_Compile", which will be stored in the Protocol element name field. Lines 2 and 3 specify relationship types that exist between a Protocol of this type and between Asset elements. For example, the relationship type ""C++_Compile.Source.Dir", shown as Line 938 in FIG. 9, relates the Protocol element type "C++ Compile" with the Asset element type "Directories" in Block 936. Likewise, the relationship type ""C++_ Compile.Dest.Dir", shown as Line 940 in FIG. 9, relates the Protocol element type "C++ Compile" with the Asset element type "Directories". At Plan generation time, these relationships are used to find all elements that can be operated on by this Protocol in a particular capacity, which in this case is either as a source or destination directory. The user will be allowed to select from a list of the allowed elements so that particular Asset elements are associated with the operation of this Protocol (and the Process incorporating the Protocol) to form a Plan. This will be discussed further below in reference to Plan generation. Further in reference to Lines 2 and 3, above, the variables "SourceDir" and "DestDir" are used during Plan generation to receive the user selected Asset element identifiers for the selected source directory and destination directory, respectively. The user-supplied contents of these variables are used to build a script prior to Plan execution.

Lines 4–6 illustrate variable declarations. Sub-process invocation is accomplished using the "URT" command field to specify the relationship type existing between the calling Process and the invoked sub-processes, as shown in lines 7 and 8. During Plan creation, the "URT" command fields will be used to find the called protocol or process, and then these command field will be converted into an invocation for the script field of the located protocol or process.

By using the &URT& command field to perform the sub-process substitution at Plan creation time instead of hard-coding the commands within the original Process, any tool changes or changes in the tool invocation mechanism will automatically be incorporated within the calling Process, and no editing of the calling Process is necessary. It will be noted that if a Process were defined by hard-coding all tool invocations within the Process, instead of through the use of relationship types, all changes involving a tool invocation would necessitate making changes to every Process calling the tool, instead of merely editing the meta-data stored within a single Protocol or Process. Additionally, by using objects and relationships between objects to define Protocols, Processes, and Plans, Interactive tools 259 such as Element Viewers can be utilized by users to view the interrelationships between these System elements for impact analysis purposes. Furthermore, these objects can be stored, retrieved, updated, and managed using the AIM EXE functions used to manage Asset elements.

Returning to the discussion of the "C++ Compiler" Process, in line 9 the variable "options" is set to the attribute options specified by the user during Plan creation. Finally, in line 10, the call to the actual scripted tool is accomplished. During script execution, the location of the tool will is determined by navigating the relationship from the Protocol to the tool element that describes the scripted tool, then by further reading the actual tool location (for example, a path name) from the located tool element. The parameter values are passed using the variables initialized in lines 7–9. The string "EXEC CPP" is the string value used to actually invoke the compiler, and will vary from tool to tool. For discussion purposes, a similar invocation command is used in this and the following examples.

The Protocols for performing file link and transfer operations follow. These definitions are similar to those discussed above in reference to the Compile Protocol, and therefor will not be described in detail.

```
LINKER(
        &ART&LINK.SOURCE.DIR&SourceDir,
&ART&LINK.DEST.DIR&DestDir)
{   DECLARE SourceDirName String
        DECLARE DestDirName String
        DECLARE Options String
SourceDirName =
DIR_NAME&URT&LINK.CALLSFORSRC.DIR_NAME&
(SourceDir)
DestDirName =
DIR_NAME&URT&LINK.CALLSFORDEST.DIR_NAME&
(DestDir)
Options = "&ATTR&Options&"
EXEC LINK(SourceDirName, DestDirName, Options)
}
FTP (
&ART&XFRFILE.SOURCE.FILE&SourceFile,
&ART&XFRFILE.DEST.DIR&DestDir)
{   DECLARE SourceFileName String
        DECLARE DestDirName String
    DECLARE Options String
SourceFileName =
FILE_NAME&URT&XFRFILE.CALLS.FILE_NAME&(SourceFile)
```

```
-continued

DestDirName =
DIR_NAME&URT&XFRFILE.CALLS.DIR_NAME&(DestDir)
Options = "&ATTR&Options&"
EXEC FTP(SourceFileName, DestDirName, Options)
}
```

Another Protocol that is shown in FIG. 9 is the "Wrap X/Open—ActX" Protocol ustrated as Block 920, used to programmatically invoke the DGate Ace tool to generate a tiveX wrapper. This Protocol may be defined as follows:

```
1   WRAP_XOPEN_ACTX(
2       &ART&WRAP_XOPEN_ACTX.SOURCE.FILE&SourceFile&,
3       &ART&WRAP_XOPEN_ACTX.DEST.DIR&DestDir&,
4       &NAME&CompName&)
5   {   DECLARE SourceFileName String
6       DECLARE DestDirName String
7       DECLARE Options String
8           SourceFileName =
FILE_NAME&URT&WARP_XOPEN_ACTX.CALLS.FILE_NAME
            &(SourceFile)
9   DestDirName =
    DIR_NAME&URT&WARP_XOPEN_ACTX.CALLS.DIR_NAME
    &(DestDir)
10  Options = "&ATTR&Options&"
11  EXEC DGATE(SourceFileName, CompName, DestDirName,
        Options)
}
```

The name of the Protocol is "Wrap_XOpen_ActX". Line 2 shows the relationship type being specified that exists between this Protocol and an element type "Source File". This relationship type will be used during Plan creation time to prompt a user for the correct source file specification. Line 3 shows the relationship type being specified that exists between this Protocol and an element type "Destination File". Line 4 declares a variable that will temporarily store the name assigned to an Asset element created by execution of this Protocol. During Plan creation time, the user will be queried to supply the name of this Asset element. During subsequent Plan execution, a newly-created Asset element will be stored within Element Inventory 102 and assigned this element name. In this instance, for example, an element will be created that stores meta-data describing the ActiveX wrapper code created upon invocation of the DGate tool. The element will be assigned the user-supplied name that will be temporarily stored in variable "CompName". Lines 5–7 declare variables that will be used within the Protocol.

Lines 8–10 are similar to those discussed above in reference to obtaining the parameter values for use in the call to the DGate tool. Line 11 provides the actual invocation to the DGate Tool, including the name supplied by variable "CompName" which will be used to name the created element.

As discussed above, the same command fields may be used within the script attribute field of the Process elements to define Processes. The distinction between Processes and Protocols is that Processes do not directly invoke tools, but instead invoke them by calling Protocols. Process further may call other Processes. The following is the pseudo code that would be stored in the Process element instances within Element Inventory 102 for the Process element types shown in FIG. 10.

The first Process element definition listed describes that element type represented as Block 1036 of FIG. 10:

```
EXTEND_ELT_DESC(EltDescriptionString, AttrTypeUid, AttrValue)
{
    EXTEND_ELT_DESC =
    EltDescriptionString + (AttrTypeUid + AttrValue)
}
```

This Process is used to concatenate the string values passed as input parameters for the purpose of generating the meta-data that will be stored within a newly-created Asset element. The concatenated value is returned by the "Extend_Elt_Desc" Process to the calling Process.

The next Process builds an ActiveX wrapper for an X/Open transaction, and is shown as Block 1002 of FIG. 10:

```
BUILD_XOPEN_ACTX
1   (&ART&WRAP_XOPEN_ACTX.SOURCE.FILE&
    XtnParameterSetFile,
2   &ART&WRAP_XOPEN_ACTX.DEST.DIR&
    WrapDestDir,
3   &ART&CPP_COMPILE.DEST.DIR&CompileDestDir,
4   &ART&LINK.DEST.DIR&LinkDestDir,
5   &NAME&CompName&)
6   {DECLARE EltDescriptionString String
7   WRAP_XOPEN_ACTX&URT&BUILD_XOPEN_
    ACTX.CALLS.
    WRAP_XOPEN_ACTX& (XtnParamterSetFile,
    CompName, WrapDestDir)
8   CPP_COMPILE &URT& BUILD_XOPEN_
    ACTX.CALLS.
    CPP_COMPILE&(WrapDestDir, CompileDestDir)
9   LINK&URT& BUILD_XOPEN_ACTX.CALLS.
    LINK&(CompDestDir, LinkDestDir)
10  EltDescriptionString=NULL
11  EXTEND_ELT_DESC&URT&BUILD_XOPEN_
    ACTX.CALLS1.
    EXTEND_ELT_DESC& (EltDescriptionString,
    "EltTypeUid", "ActXComp")
12  EXTEND_ELT_DESC&URT&BUILD_XOPEN_
    ACTX.CALLS2.
    EXTEND_ELT_DESC& (EltDescriptionString,
    "EltName", CompName)
13  EXTEND_ELT_DESC &URT&BUILD_XOPEN_
    ACTX.CALLS3.
    EXTEND_ELT_DESC& (EltDescriptionString,
    "EltLocation", LinkDestDir, CompName)
14  ADD_INV&URT&BUILD_XOPEN_ACTX.CALLS.
    ADD_INV& (EltDescriptionString)
    }
```

Lines 1–4 are Asset element assignments made using relationship types in a manner discussed above. (These relationship types are not shown in FIG. 10.) Line 5 defines the string that will receive the Asset element name that is to be created by the execution of this Process as a Plan in a manner similar to that described above. Line 6 declares a variable used later to build the meta-data that will be stored in a newly-created element. Lines 7–9 are the sub-process calls represented by the relationship types shown as Lines 1012, 1014, and 1016, respectively of FIG. 10. These relationship types will be used at Plan creation time to locate the Wrap, Compile, and Link Protocols used by this Process. Line 10 sets the string variable "EltDescription" to Null. Lines 11–13 make three successive calls to sub-process "Extend_Elt_Desc" shown as Block 1036 of FIG. 10 and described above. These calls are represented by relationship types shown as Lines 1038–1042, respectively of FIG. 10. These calls concatenate information that will be stored as meta-data in a newly-created element that describes the newly-created wrapper generated by the invocation of the DGate tool. Finally, line 14 is a call to add the new element to the Element Inventory 102, and is specified using the relationship type shown as Line 1018 of FIG. 10.

The following Process is shown as Block 1020 in FIG. 10, and is used to generate and transfer an ActiveX wrapper for an X/Open transaction:

```
BUILD_XFR_XOPEN_ACTX
1   (&ART&WRAP_XOPEN_ACTX.SOURCE.FILE&
        XtnParameterSetFile,
2   &ART&WRAP_XOPEN_ACTX.DEST.DIR&WrapDestDir,
3   &ART&CPP_COMPILE.DEST.DIR&CompileDestDir,
4   &ART&LINK.DEST.DIR&LinkDestDir,
5   &ART&XFR_FILE.DEST.DIR&XfrDestDir
6   &NAME&CompName&)
    {
7   BUILD_XOPEN_ACTX&URT&BUILD_XFR_XOPEN_ACTX.
    CALLS.BUILD_XOPEN_ACTX& (XtnParameterSetFile, CompName,
    WrapDestDir, CompileDestDir, LinkDestDir)
8   XFRFILE&URT&BUILD_XFR_XOPEN_ACTX.CALLS.
    XFRFILE&(CompName, XfrDestDir)
    }
```

Lines 1–6 of the above Process are similar to those discussed above in reference to other Processes and will not be described in detail. Line 7 shows the sub-process call made by specifying the relationship type shown as Line 1024 of FIG. 10, and Line 8 shows the sub-process call made by specifying the relationship type represented by Line 1026 of FIG. 10.

The foregoing Protocols and Processes are examples of those that may be defined by a system administrator or a user. In an extended version of the Object Management System, the creation of these elements would be performed using a rules-based version of Process Manager 126. This rules-based tool would include the rules describing allowable options for each tool, and describing allowable Protocols for use in particular types of Processes. It may further be noted that Processes and Protocols may further be defined to include conditional logic for error handling and recovery purposes. This conditional logic is of the type provided by typical scripting languages.

Plans

As noted in the above-described examples, Processes describe a set of generalized steps that may be performed on any set of elements. The actual elements themselves are not identified within a Process. In contrast, a Plan actually names a set of elements that will be operated on by a specified Process to accomplish a particular task.

A Plan is stored in an element of type "Plan" 710 as shown in FIG. 7. This type of element is created by a tool known as a Plan Wizard 265 which is one of the Interactive Tools 259. The Plan Wizard has access to the element type definitions stored in EIS 103 through the AIM EXE 232 as shown by Lines 262 and 264 of FIG. 2. Using these element types, the Plan Wizard is able to query a user to select a particular element of type Process for use in Plan development. In the preferred embodiment, this is accomplished by providing a list of all defined Process elements stored within the Element Inventory 102. The names of the elements are natural language phrases so that a user may select an operation based on the desired outcome, and without knowing the manner in which the operation will be performed. For example, the user may choose a Process titled "Build_ActX_Wrapper" to build the desired Plan and thereafter invoke the function. The user need not have any knowledge of the tools or tool interfaces being invoked to accomplish the task. This greatly simplifies code development, transformation, and management operations.

Once a particular Process element is selected, the Plan Wizard locates the selected Process element subtype in EIS 103. The Plan Wizard next uses the predefined relationship types that are defined between the selected Process element subtype and various Asset element types to query the user for Asset element selection. This is accomplished by building a list of all Asset elements within Element Inventory 102 that are of a particular Asset element type for each of the Asset element types used by the selected Process element type, then querying the user to select from the list. The selected elements are used for Plan development.

An additional attribute field called the "UsesAssetsRules" attribute field may be included in a Process, and is used to determine how a user is to be queried to accomplish Asset element selection during Plan creation. This attribute field identifies instances in which an Asset element is "used" multiple times by a Process. For example, in the foregoing code description for the "Build_Xfr_XOpen_ActX" Process, it may be desirable to use the same destination directory during both the compile and link operations. In this case, there is no reason to query the user twice to supply the desired directory Asset element name. Instead, the "UsesAssetsRules" attribute can be included in the Process element to indicate this dual use of the Asset element to the Plan Wizard 265, and to thereby prevent the Plan Wizard from making an unnecessary user query. The format of this field is as follows:

CompileDestDir=LinkDestDir

After the user is queried for all necessary information, the Plan Wizard builds a Plan from the Process. This is done by copying selected portions of the Script attribute field from the Process into the Script attribute field for the newly-created Plan element. Selected commands from the Process element are replaced with different commands. For example, the relationships specified by the "URT" commands used to relate Processes to other sub-processes or Protocols are used to navigate to the lowest level Protocols and Processes used by a Process. The script commands in these lowest-level Protocols and Processes are substituted in place of the "URT" commands. The user-supplied Asset element names are substituted in place of the parameter variables originally contained in the tool invocation, and the script is then ready for execution.

Once a Plan is constructed in the foregoing manner, it may be passed immediately by Plan Wizard 265 to the Plan Hub 288. Plan Hub cooperates with Script Controller 289 to control Plan execution by Script Engine 273. If the Plan is not to be executed immediately, it may be stored in Element Inventory 102 and retrieved later for scheduled execution. A Plan may be re-scheduled for execution at predetermined intervals, or based on system availability. However, it is advantageous to generate a script just prior to execution so that any changes to Processes or Scripted Tools will be reflected in the newly-created script. In addition, updates to Asset elements will further be included in the script assuming the Element Inventory is current.

Figure 11A:
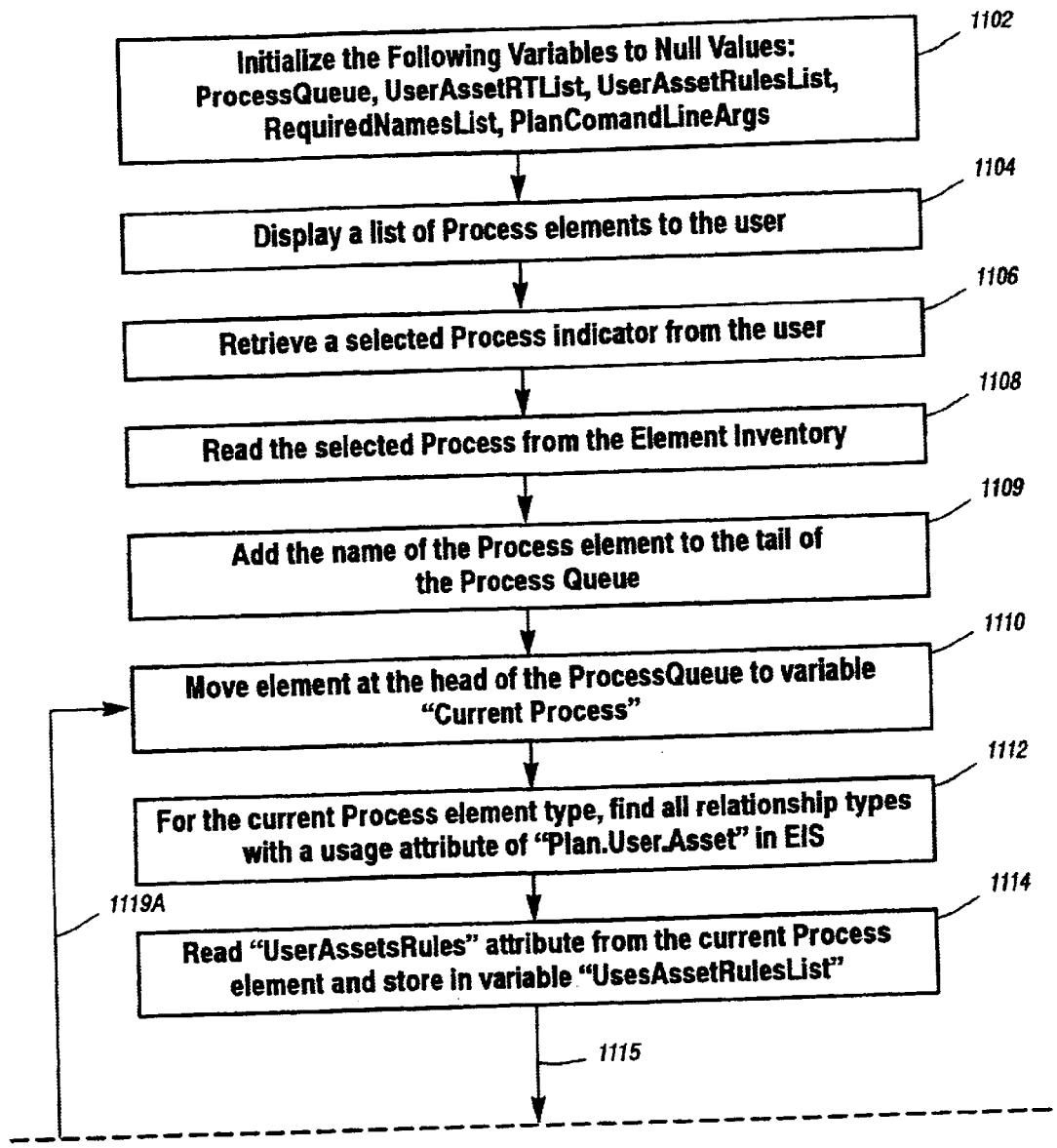
FIGS. 11A–11C, when configured as shown in FIG. 11, are a flowchart of the computer-implemented method used by Plan Wizard to develop a Plan from a Process.
Figure 11B:
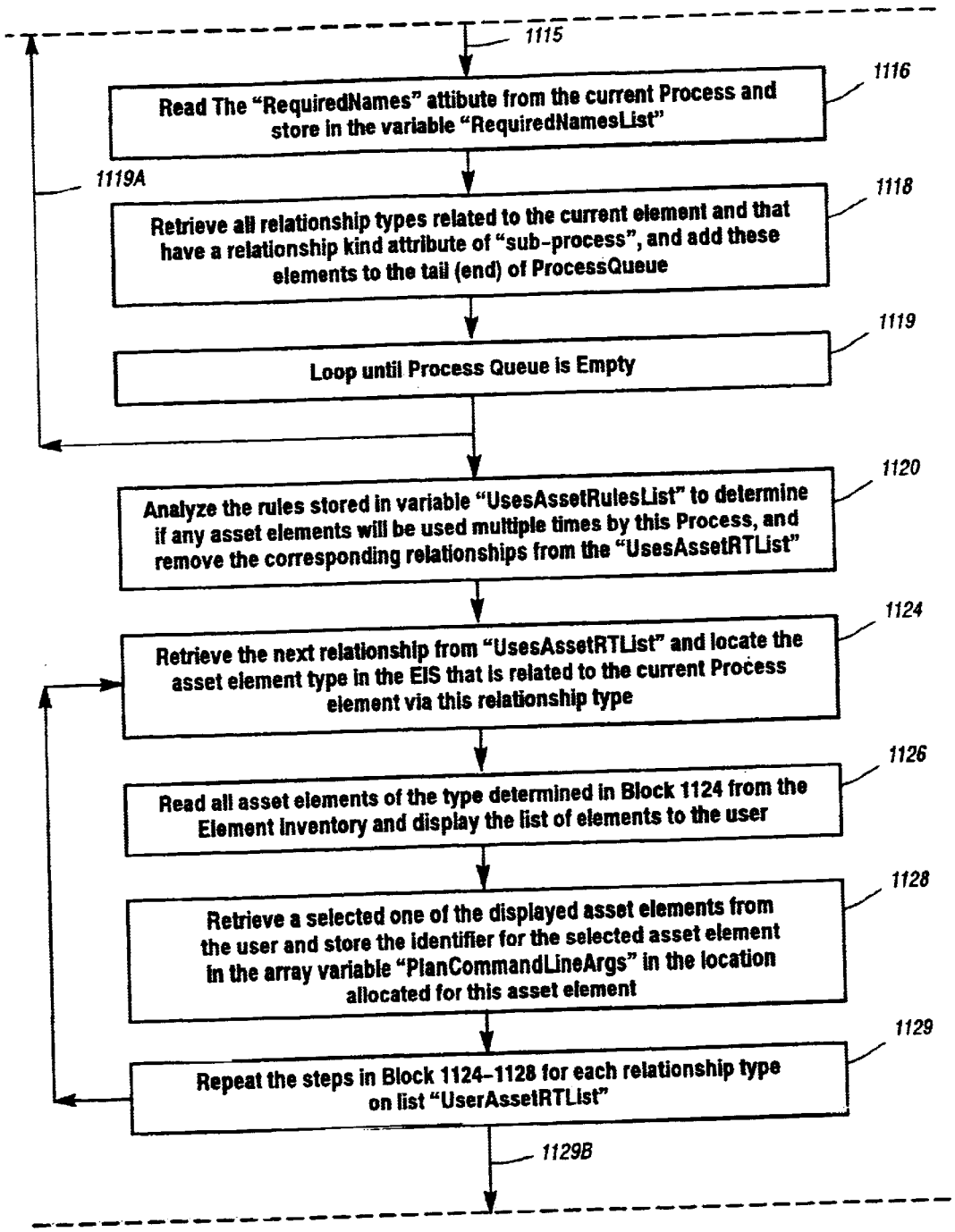
Figures 11, 11A, 11B, 11C:
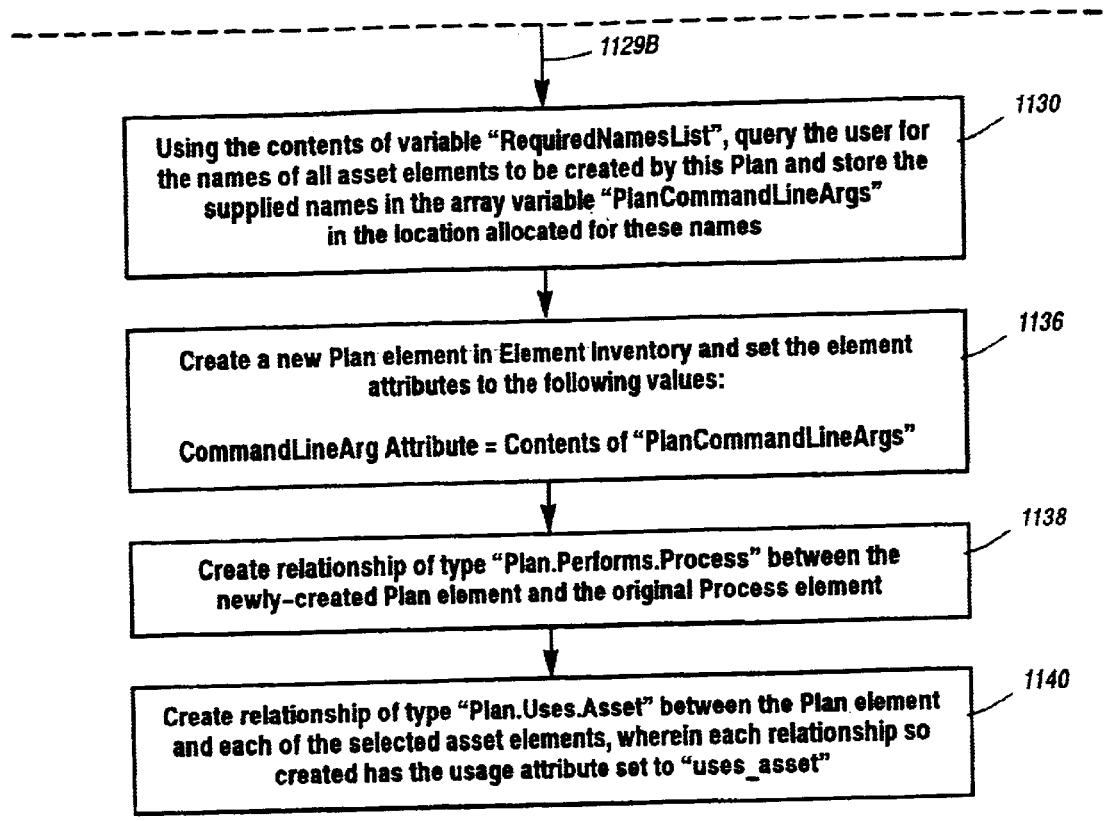

FIGS. 11A–11C, when configured as shown in FIG. 11, are a flowchart of the computer-implemented method used by Plan Wizard to create a Plan element based on user selection of a Process element and the Asset elements against which the Plan is to operate. Step 1102 shows initialization of variables that will be used in the Plan development. Following variable initialization, Plan Wizard next displays a list of Process elements to the user, as shown in Step 1104. This list is developed by reading the names of all elements from Element Inventory 102 that have an element type of "Process". The user can select the desired Process using any of the graphical or other user interfaces known in the art. As mentioned above, the list of Processes of the preferred embodiment is described using natural language phrases such that the user need not be familiar with specific tools or tool interfaces when building the Plan. The user only needs to understand the general type of operation that is to be performed. In one embodiment, each Process element could contain an attribute field that includes a brief description of the task to be performed by the associated Process, and the manner in which the Process will be used. This attribute field may be displayed to the user during Process selection to further aid the user during Plan development.

In Step 1106, Plan Wizard retrieves the user-selected Process. The selected Process is read from Element Inventory 102 as illustrated in Step 1108. The element name and definition is added to the tail of the ProcessQueue, which is a queue variable used for temporary storage, and which was initialized in Step 1102. This is shown in Step 1109.

Next a processing loop is entered. The Process element residing at the head of the ProcessQueue variable is moved to the variable "Current Process", as shown in Step 1110. For this current Process element type, all relationship types stored in EIS 103 that are related to the current element type, and that have a Usage attribute 816 of "Plan.Uses.Asset" as shown in FIG. 8, are retrieved and stored in the "UsesAssetRTList" variable. This step is shown in Step 1112. Next, the "UsesAssetsRules" attribute is read from the current Process element, and is temporarily stored in the variable "UsesAssetRulesList", as illustrated in Step 1114. Flow continues to FIG. 11B as shown by Arrow 1115. Similarly, the "RequiredNames" attribute is read from the current Process element to be temporarily stored in the variable "RequiredNamesList", as shown in Step 1116. This attribute includes all of the command lines that include the "&NAME&" tag as shown in the exemplary Protocols and Processes described above. Next, all relationship types stored in EIS 103 that are related to the current element type, and that have a relationship kind attribute 1019 of "Sub-process" as shown in FIG. 10, are retrieved and added to the tail (end) of the ProcessQueue variable. This is illustrated in Step 1118.

Steps 1110–1118 are repeated until the ProcessQueue is empty as indicated by Step 1119 and Arrow 1119A.

Next, Plan Wizard analyzes the contents of "UsesAssetRulesList" to determine if any Asset elements are used by the current Process multiple times. If any Asset elements are used multiple times, the relationship types that correspond to the re-used elements are removed from the "UsesAssetRTList" so that the Plan Wizard does not unnecessarily query the user multiple times for the same Asset element identification. This is displayed in Step 1120. For each relationship type remaining on the "UsesAssetRTList", Plan Wizard retrieves the next relationship, then uses the definition in the EIS 103 to determine the type of Asset element having that relationship type, as illustrated in Step 1124. All elements of the determined Asset element type are then read from the Element Inventory and displayed to the user, as shown in Step 1126. The user may also be provided with a query string contained in an attribute for the selected Process that corresponds to the query being performed. For example, the user may be queried with the string "Select an element that designates the compile input file." The user then makes an asset element selection. For each asset element specified by the user, the element identifier associated with the selected asset element is entered into the variable "PlanCommandLineArgs". "PlanCommandLineArgs" is a variable that stores the element identifiers in the same order as the associated &ART& command fields appear in the Protocol or Process definition. The selection and storing of the asset element identifiers are shown in Step 1128. Steps 1124–1128 are repeated for all relationships in list "UsesAssetRTList", as shown by Step 1129 and Arrow 1129A.

Upon exiting this processing loop, control continues to FIG. 11C as indicated by Arrow 1129B. Plan Wizard uses the variable "RequiredNamesList" to query the user for the names of all elements to be created by the Plan, as illustrated by Step 1130. In a manner similar to that described above in reference to the acquisition of asset element names, the names of elements selected during this step are stored in array variable "PlanCommandLineArgs" such that the complete list of Asset element identifiers and name identifiers comprise an ordered list. The ordered list of identifiers has an order that is the same as the order the associated &ART& and &NAME& command fields appear in the Protocol or Process definition. The selection and storing of these identifiers is shown in Step 1130.

Next, Plan Wizard creates an element of type "Plan" in Element Inventory 102 for the newly-created Plan. The "CommandLineArg" attribute for this element is set to the value contained in variable "PlanCommandLineArgs". This is illustrated by Step 1136. A relationship of type "Plan.Performs.Process" is created between the newly-created Plan element and the original, user-selected Process element, as shown in Step 1138. Additional relationships of type "Plan.Uses.Asset" are created in the Element Inventory between the Plan element and each selected Asset element, with the usage attribute of these relationships set to "uses_asset" as shown in Step 1140.

After the Plan element is stored, the Plan may be executed immediately or at some future scheduled time. At Plan execution time, a script will be created by Plan Hub 288 using the Plan definition stored in the Plan element, and further using the script attribute field of the related Process element.

Figure 12:
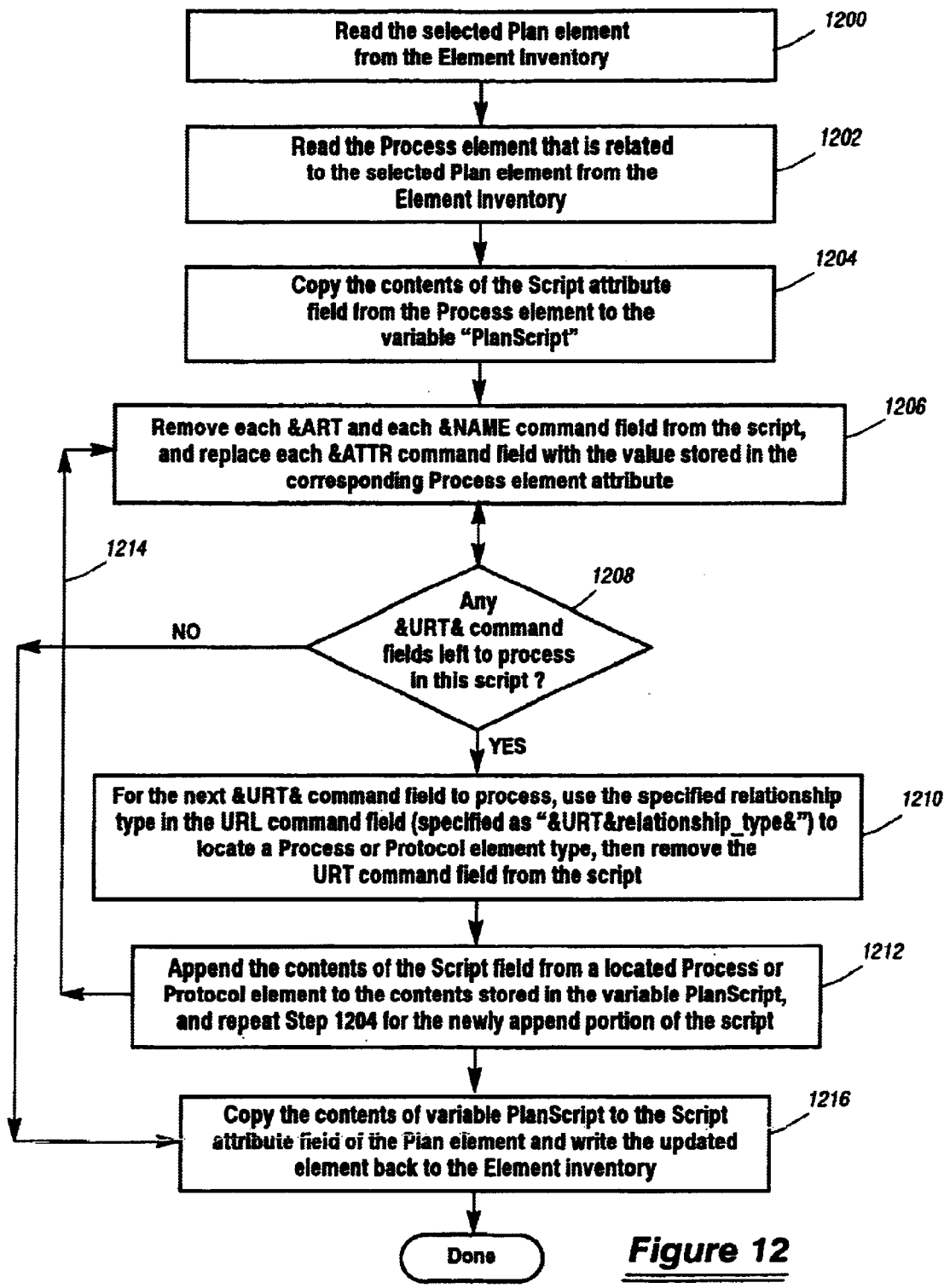
FIG. 12 is a flowchart illustrating the creation of the script of a Plan.

FIG. 12 is a flowchart illustrating the creation of the script of a Plan. In Step 1200, a Plan element is read from the Element Inventory 102. In Step 1202, the Process element that is related to the Plan element is read from the Element Inventory 102. The entire script attribute field from this Process element is copied to the variable "PlanScript", as displayed in Step 1204. Next, all "&ART&" and "&NAME&" command fields are removed from the script stored in variable "PlanScript". Additionally, each "&ATTR&" command field is replaced with the value stored in the Process element "&ATTR&" command field. This is indicated by Step 1206.

Next, it is determined whether there are any &URT& command fields to process for the script stored in variable "PlanScript", as indicated by decision Step 1208. If there are, the located &URT& command field is removed from the variable "PlanScript", and the relationship contained in this field is used to retrieve the associated Process or Protocol. After the element is located, the "&URT&" command field is removed from the script. This is shown in Step 1210. The Script attribute field from the retrieved Process or Protocol is appended to the value stored in variable "PlanScript", as illustrated by Step 1212. The steps shown in Steps 1206 and 1208 are repeated for the newly-appended portion of the script, as shown by Arrow 1214.

After all &URT& command fields are processed, the value stored in "PlanScript" is written to the "Script" Attribute field of the selected Plan element in Element Inventory 102. This is shown in Step 1216.

It may be noted that script creation may be performed at the time the Plan element is created in the Element Inventory. However, if the script is executed at a later time, any tool and Asset element changes reflected in the Element Inventory will not be reflected in the script. Therefor, it is desirable to create the script just prior to each occurrence of script execution.

The above-described method can better be understood by example. Assume a Plan element has already been created from the process "WRAP_XOPEN_ACTX". This Plan element contains a list of user-supplied parameters in the "PlanCommandLineArgs" that was generated pursuant to the method described in FIG. 11. When this Plan is to be executed, the script is generated using the steps described in FIG. 12.

More specifically, according to Steps 1200 and 1202 of FIG. 12, the selected Plan and related Process elements are read from the Element Inventory. The entire Script attribute field of the Process "WRAP_XOPEN_ACTX" is then copied into the variable "PlanScript", as shown in Step 1204 of FIG. 12. Thus, this variable will contain the following, which is as listed above in reference to the description of this Process:

```
WRAP_XOPEN_ACTX(
    &ART&WRAP_XOPEN_ACTX.SOURCE.FILE&SourceFile&,
    &ART&WRAP_XOPEN_ACTX.DEST.DIR&DestDir&,
    &NAME&CompName&)
    {   DECLARE SourceFileName String
        DECLARE DestDirName String
        DECLARE Options String
            SourceFileName =
    FILE_NAME&URT&WRAP_XOPEN_ACTX.CALLS.FILE_NAME
            &(SourceFile)
        DestDirName =
    DIR_NAME&URT&WRAP_XOPEN_ACTX.CALLS.DIR_NAME
        &(DestDir)
        Options = "&ATTR&Options&"
        EXEC DGATE(SourceFileName, CompName, DestDirName,
            Options)
    }
```

Next, all "&ART&" and "&NAME&" command fields are removed. As discussed above, these field identifiers are needed to identify relationships between Process elements and Asset elements so that a user may be queried for Asset element names. This was described in reference to FIG. 11, and was necessary to generate the contents of the "PlanCommandLineArgs" attribute of the Plan element. When these fields are removed, the respective relationship identifiers (such as "WRAP_XOPEN_ACTX.CALLS.FILE_NAME") are also removed, and only variable designators (such as "SourceFile") remain.

In addition to removing the "&ART&" and "&NAME&" fields, the "&ATTR&" command fields are replaced with the values stored in the corresponding attribute fields of the Process element. In this case, the "Options" attribute field of the Process element "WRAP_XOPEN_ACTX" stores a value indicating the execution options used to control invocation of the DGate tool. These kinds of attributes will each be in the form of a character string. For this example, assume the Options attribute for this Process element stores the string "-d", which indicates the DGate tool is to be invoked in debug mode. After these substitutions are made as described in Step 1206 of FIG. 12, the value stored in the "PlanScript" variable is as follows:

```
WRAP_XOPEN_ACTX(SourceFile, DestDir, CompName,)
    {   DECLARE SourceFileName String
        DECLARE DestDirName String
        DECLARE Options String
        SourceFileName =
FILE_NAME&URT&WRAP_XOPEN_ACTX.CALLS.FILE_NAME
            &(SourceFile)
        DestDirName =
DIR_NAME&URT&WRAP_XOPEN_ACTX.CALLS.DIR_NAME
&(DestDir)
        Options = "-d"
        EXEC DGATE(SourceFileName, CompName, DestDirName,
        Options)
}
```

Next, the "&URT&" command fields are processed, as shown in Steps 1208–1212, and the processing loop indicated by Arrow 1214 of FIG. 12. For a given "&URT&" command field, this involves first reading the elements described by the relationship in that "&URT& field. For example, the relationship
  "WRAP_XOPEN_ACTX.CALLS.FILE_NAME"
used to get the source file name is used to retrieve the Process element "FILE_NAME". The Script Attribute Field of Process element "FILE_NAME" is appended to the contents of the "PlanScript" Variable, and the "&URT&" field being processed is removed. After processing the "&URT&" command field for the "SourceFileName" function call, the contents of "PlanScript" will be as follows:

```
WRAP_XOPEN_ACTX(SourceFile, DestDir, CompName)
    {   DECLARE SourceFileName String
        DECLARE DestDirName String
        DECLARE Options String
            SourceFileName = FILE_NAME(SourceFile)
    DestDirName =
    DIR_NAME&URT&WRAP_XOPEN_ACTX.CALLS.DIR_
    NAME&(DestDir)
        Options = "-d"
        EXEC DGATE(SourceFileName, CompName, DestDirName,
        Options)
}
FILE_NAME(FileString)
{
DECLARE ReadInvString String
    if(FileString isA Uid), then
        ReadInvString = "Name(" + FileString + ")"
        FILE_NAME =
            READ_INV&URT&FILE_
            NAME.CALLS.READ_INV&
(ReadInvString)
        else
            if (FileString == NULL), then
                FILE_NAME = Protocol.DefaultFileName
            else FILE_NAME = FileString
                endif
        endif
}
```

The steps are repeated for the newly-appended script portion "FILE_NAME". In this case, the newly appended script portion does not include any "&ART&" or "&NAME&" attribute fields. However, upon repeating the processing steps, one of the remaining "&URT&" fields in this script will be processed. Assuming the first occurrence of this command field is processed first (as occurring in the "DestDirName" invocation), this will result in the contents of variable "PlanScript" being modified to the following:

```
WRAP_XOPEN_ACTX(SourceFile, DestDir, CompName)
    {   DECLARE SourceFileName String
        DECLARE DestDirName String
        DECLARE Options String
        SourceFileName = FILE_NAME (SourceFile)
    DestDirName = DIR_NAME (DestDir)
        Options = "-d"
        EXEC DGATE(SourceFileName, CompName, DestDirName,
        Options)
}
FILE_NAME(FileString)
{
DECLARE ReadInvString String
    if (FileString isA Uid), then
        ReadInvString = "Name(" + FileString + ")"
FILE_NAME =
    READ_INV&URT&FILE_NAME.CALLS.READ_INV&
    (ReadInvString)
    else
        if (FileString = NULL), then
            FILE_NAME = Protocol.DefaultFileName
        else FILE_NAME = FileString
            endif
    endif
}
DIR_NAME(DirString)
{
DECLARE ReadInvString string
    if (DirString isA Uid), then
        ReadInvString = "Name(" + DirString + ")"
DIR_NAME =
    READ_INV&URT&DIR_NAME CALLS.READ_INV&
    (ReadInvString)
    else
        if (DirString == NULL), then
            DIR_NAME = Protocol.DefaultDirName
        else DIR NAME = DirString
        endif
endif
}
```

The processing loop indicated by Arrow 1214 of FIG. 12 will again be repeated several times for the "&URT&" fields in the "FILE_NAME" and "DIR_NAME" processes such that the final value of "PlanScript" will be as follows:

```
WRAP_XOPEN_ACTX(SourceFile, DestDir, CompName)
    {   DECLARE SourceFileName String
        DECLARE DestDirName String
        DECLARE Options String
            SourceFileName = FILE_NAME(SourceFile)
    DestDirName = DIR_NAME(DestDir)
        Options ="-d"
        EXEC DGATE(SourceFileName, CompName, DestDirName,
        Options)
}
FILE_NAME(FileString)
{
DECLARE ReadInvString String
    if (FileString isA Uid), then
        ReadInvString = "Name(" + FileString + ")"
FILE_NAME = READ_INV (ReadInvString)
    else
        if (FileString = NULL), then
            FILE_NAME = Protocol DefaultFileName
        else FILE_NAME = FileString
            endif
    endif
}
```

-continued

```
DIR_NAME(DirString)
{
DECLARE ReadInvString string
    if (DirString isA Uid), then
        ReadInvString = "Name(" + DirString + ")"
DIR_NAME = READ_INV (ReadInvString)
    else
        if (DirString == NULL), then
            DIR_NAME = Protocol.DefaultDirName
        else DIR_NAME = DirString
            endif
endif
}
READ_INV(QueryString)
{
    DECLARE InvObject ComObject
    Set InvObject = CreateObject("AIM.INV")
    InvObject.BeginXtn
    READ_INV = InvObject.GetElements(QueryString)
    InvObject.AbortXtn
}
```

It will be noted that the value in "PlanScript" has now been developed into a series of commands that can be executed by a script engine. The commands provided by Process "WRAP_XOPEN_ACTX" form the main body of the "code", and the subsequent Processes such as "FILE_NAME" define what may be thought of as subroutines invoked via function calls included in this main code body. The script includes both scripted tool invocations such as "EXEC DGATE(SourceFileName, CompName, DestDirName, Options)"

and further include invocations to AIM EXE functions, such as specified by the command "READ_INV=InvObject.GetElements(QueryString)".

The value of "PlanScript" is recorded in the current Plan element, which is stored back to the Element Inventory.

A script engine capable of executing the associated scripting language can execute the script described above when passed the parameter list associated with the main function call "WRAP_XOPEN_ACTX". In this case, the required parameter list includes "SourceFile, DestDir, CompName". These values to be passed for these parameters are identified as the comma-delimited list of Asset element identifiers that is stored in the "PlanCommandLineArgs" attribute of the Plan element in a manner described above. In the preferred embodiment, each of these identifiers is a list of alphanumeric characters.

Assume for the current example that the value stored in the "PlanCommandLineArgs" attribute field of the Plan element is "File1, Dir1, Name1", wherein "File1", "Dir1", and "Name1" are each unique identifiers that can be supplied to retrieve elements from, or create new elements within, the Element Inventory 102. The use of these arguments is described below in reference to execution of the Plan.

Figure 13:
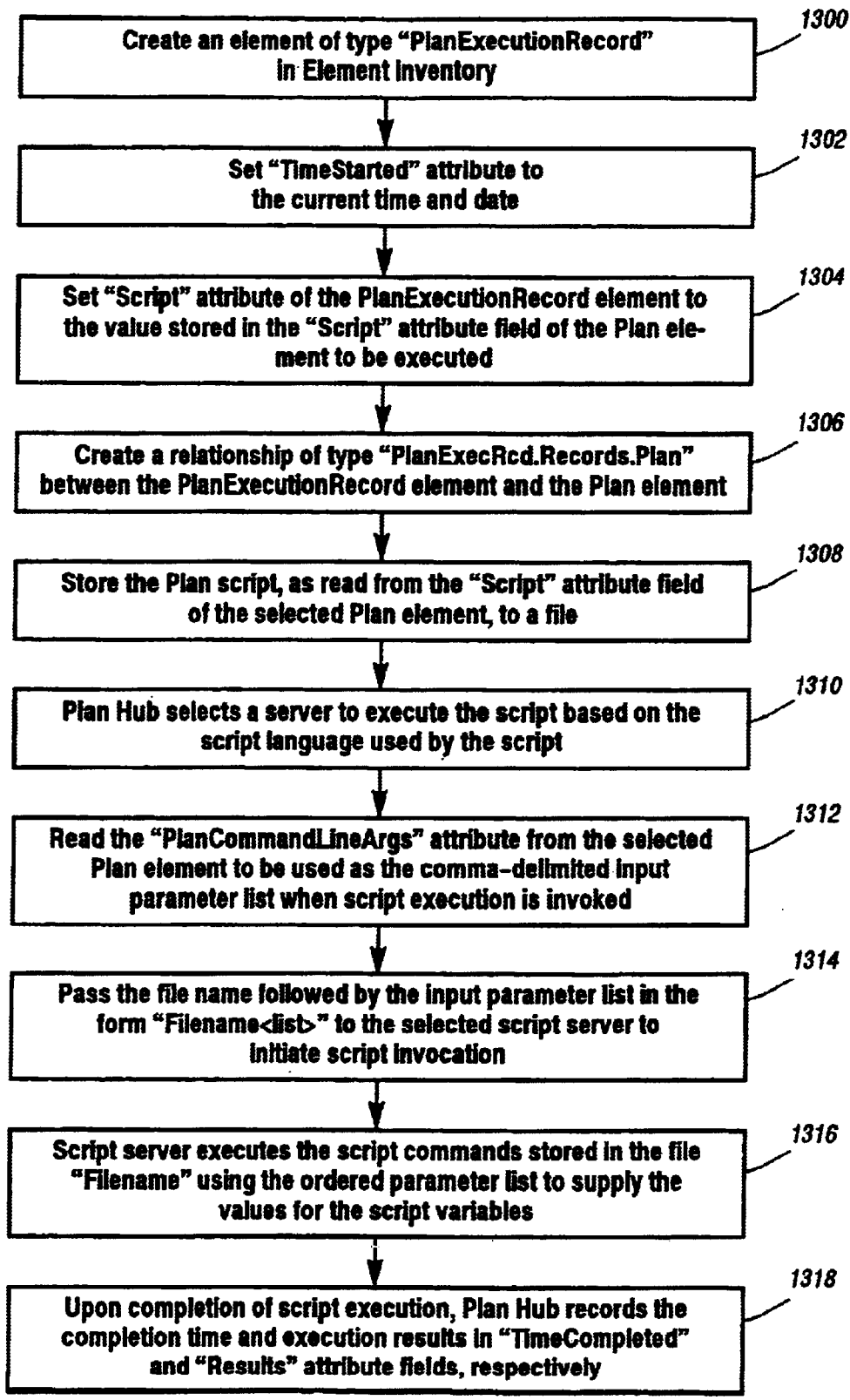
FIG. 13 is a flowchart of the computer-implemented method used to execute a Plan.

FIG. 13 is a flowchart of the computer-implemented method used to execute a Plan.

In Step 1300, Plan Hub 288 creates an element of the type "PlanExecutionRecord" in Element Inventory. This element is used to record information about script execution, and may be used to track and manage various code versions existing on the same platform. In Step 1302, a "TimeStarted" attribute is set to the current time and date. Next, the "Script" attribute of the PlanExecutionRecord element is set to the value stored in the "Script" attribute field of the Plan element, as illustrated by Step 1304. A relationship of type "PlanExecRcd.Records.Plan" shown by Line 814 of FIG. 8 is created between the Plan Execution Record element and the Plan element, as illustrated by Step 1306. Next, the contents of the "Script" attribute field of the Plan element are stored to a file, which for the current example will be assumed to have the name "ScriptFile". This is shown in Step 1308.

According to one embodiment, various ones of the Protocols and Processes could be written in different scripting languages, and various Script Severs could be available in the Object Management System each to execute a different scripting language. In this case, Plan Hub must select an appropriate Script Server to execute the script, as is shown by Step 1310. In Step 1312, Plan Hub 288 reads the "PlanCommandLineArgs" attribute field from the Plan element. Using the above example, this value is set to the string "File1, Dir1, Name1". Plan Hub passes the file name along with this parameter list to the selected Script Engine to invoke the script execution, as illustrated in Step 1314. In the current example, the passed string will be as follows:

"ScriptFile File1, Dir1, Name1".

The Script Engine 273 executes the script instructions contained in the designated file "ScriptFile" using the parameter list "File1, Dir1, Name1" as the input parameters. This is shown in Step 1316. Upon completion of script execution, the Plan Hub 288 records the completion time and the results of script execution in the "TimeCompleted" and "Results" attribute fields, respectively, of the Plan execution record element, as indicated by Step 1318.

The above-described manner in which the Protocol, Process and Plan elements are defined within EIS 103 provides benefits to the user of the Object Management System. Modifications to the scripted tools can be made completely transparent to the user. In fact, the user need not even be aware of the tools actually being invoked to perform a specific task. Because relationships are used to define the interaction between the Protocols, Processes, and Plans, tools such as Element Viewers 144 can be used to readily determine impact analysis when a tool, code, or data module is changed or deleted within the system. Additionally, tools such as the Plan Wizard can use the standard AIM EXE 232 to read, write, and manage the System elements in a manner which is similar to the way Asset elements are managed. Furthermore, because Plans are developed using interrelated entities rather than hard-coded scripts, any recent changes made to any given Protocol will be reflected in every Process and Plan that uses that Protocol by virtue of the existing relationship. Editing of multiple Processes and Plans need not be performed to include the change.

Having described an exemplary embodiment of the invention in the drawings and accompanying description, those skilled in the art will recognize that various modifications to the exemplary embodiment could be made without departing from the scope and spirit of the claims set forth below.

What is claimed is:

1. For use in an object management system for managing software modules, the object management system having a repository memory for storing objects wherein ones of the objects are asset objects that are each descriptive of a respective one of the software modules, the object management system further including server memory coupled to the repository memory for storing interactive tools, each of the interactive tools having a respective tool interface, each of the interactive tools for performing one or more operations on the software modules, the object management system including a process-based interface for the interactive tools, comprising:

first memory means for storing protocols, each of said protocols being associated with a respective one of the operations performed by a respective one of the interactive tools, each of said protocols to specify how said respective one of the operations will be accomplished by said respective one of the interactive tools; and second memory means coupled to said first memory means for storing processes, ones of said processes specifying the manner in which one or more associated ones of said protocols will be executed to accomplish a respective task.

2. The process-based interface of claim 1, and further including third memory means coupled to said second memory means for storing plans, each of said plans associating a respective process with one or more of the software modules, and whereby said plan defines said respective task executed against said one or more software modules.

3. The process-based interface of claim 2, and further including Element Inventory Schema (EIS) memory means for storing type definitions used to create each of said protocols, said processes, and said plans.

4. The process-based interface of claim 2, wherein said memory management means includes tool means for managing the asset objects, and wherein said tool means may also be used to manage said protocols, said processes, and said plans.

5. The process-based interface of claim 2, wherein said first memory means includes means for storing tool relationship indicators each for associating a respective one of said protocols to said respective one of the interactive tools.

6. The process-based interface of claim 5, wherein said second memory means includes means for storing protocol relationship indicators each for associating a respective one of said processes to a respective one of said one or more associated ones of said protocols.

7. The process-based interface of claim 5, wherein ones of said processes are associated with different ones of said processes that are sub-processes, wherein said sub-processes are executed to accomplish said respective task, and wherein said second memory means includes means for storing sub-process relationship indicators each for associating a respective one of said processes to a respective different one of said sub-processes.

8. The process-based interface of claim 7, wherein said third memory means includes the means for storing process relationship indicators each for associating a respective one of said plans to a respective one of said processes.

9. The process-based interface of claim 8, wherein said third memory means includes relationship means for storing asset relationship indicators each for associating a respective one of said plans to a respective one of said asset objects for mapping said respective one of said plans to the software module described by said respective one of said asset objects.

10. The process-based interface of claim 1, and further including plan creation means coupled to said third memory means for allowing a user of the object management system to interactively create ones of said plans by selecting for each said plan a respective one of said processes and for further selecting respective ones of the asset objects descriptive of selected ones of the software modules.

11. The process-based interface of claim 10, wherein said plan creation means includes user interface means for creating each of said plans by selecting said respective ones of said processes using natural language descriptions that are independent of any one of the tool interfaces.

12. The process-based interface of claim 11, and further including plan execution means for automatically executing a selectable one of said plans on said selected ones of the software modules as determined by said respective ones of said asset objects that are indicative of said selected ones of the software modules.

13. The process-based interface of claim 12, and further including plan hub means for creating plan execution records to record status regarding execution by said plan execution means of said selectable one of said plans.

14. The process-based interface of claim 1, wherein said second memory means includes means for storing in ones of said processes one or more conditional logic expressions, wherein evaluation of said one or more conditional logic expressions results in selective invocation of said associated ones of said protocols to accomplish said respective task.

15. For use in an object management system for managing code and data modules, the object management system having a repository memory for storing asset objects that are each descriptive of a respective one of the code and data module, the object management system further including tools each to perform functions on associated ones of the code and data modules, and wherein sequences of functions may be performed to accomplish a given operation on ones of the code and data modules, the process-based tool interface, comprising:

an Element Inventory (El) repository included in the repository memory having first memory circuits to store protocol objects each to automatically invoke an associated one of the tools to perform an associated one of the functions;

An Element Inventory Schema (EIS) repository coupled to said El repository having first EIS memory circuits to stored a respective object definition for a respective one of said protocol objects indicating the manner in which said respective one of said protocol objects invokes said associated tool.

16. The process-based tool interface of claim 15, wherein said El repository includes second memory circuits to store tool objects each descriptive of a respective one of the tools.

17. The process-based tool interface of claim 16, wherein said second memory circuits further include circuits to store protocol relationships each existing between a respective one of said protocol objects and the one of said tool objects that is descriptive of said associated tool invoked by said respective one of said protocol objects.

18. The process-based tool interface of claim 16, wherein said EIS repository further includes second EIS memory circuits to store a respective object definition for each of said tool objects indicating the manner in which said each tool object may be related to an associated one of said protocol objects.

19. The process-based tool interface of claim 15, wherein said El repository includes third memory circuits to store process objects each descriptive of a respective one of the operations accomplished by execution of one or more invoked ones of the functions.

20. The process-based tool interface of claim 19, wherein said third memory circuits further include circuits to store one or more first process relationships, each of said first process relationships existing between a respective one of said process objects and a respective one of said protocol objects that is associated with one of said one or more invoked ones of the functions.

21. The process-based tool interface of claim 20, wherein said EIS repository further includes third EIS memory circuits to store a respective object definition for each of said process objects, and further to store a relationship type for each of said first process relationships to define the manner in which each of said first process relationships interrelates a respective one of said process objects to a respective one of said protocols.

22. The process-based tool interface of claim 15, wherein said EI repository further includes fourth memory circuits to store second process relationships, each of said second process relationships existing between a respective one of said process objects and a respective different one of said process objects, wherein said different one of said process objects is invoked as a sub-process associated with one of said one or more invoked ones of the functions.

23. The process-based tool interface of claim 22, wherein said EIS repository further includes fourth EIS memory circuits to store a relationship type for each of said second process relationships to define the manner in which each of said second process relationships interrelates a respective one of said process objects to a different respective one of said process objects.

24. The process-based tool interface of claim 15, wherein said EI repository includes fifth memory circuits to store plan objects each descriptive of the manner in which a respective one of the operations as described by an associated one of said process objects is executed on a selectable set of the code and data modules.

25. The process-based tool interface of claim 24, wherein said fifth memory circuits further include circuits to store first plan relationships, each of said first plan relationships existing between a respective one of said plan objects and said associated one of said process objects.

26. The process-based tool interface of claim 25, wherein said fifth memory circuit include additional circuits to store second plan relationships, each of said second plan relationships existing between a respective one of said plan objects and a respective one of the asset objects wherein said respective one of the asset objects is descriptive of a respective one of said selectable set of the code and data modules.

27. The process-based tool interface of claim 26, wherein said EIS repository further includes fifth EIS memory circuits to store a relationship type for each of said first plan relationships to define the manner in which each of said first plan relationships interrelates a respective one of said plan objects to said associated one of said process objects.

28. The process-based tool interface of claim 24, further including plan creation means coupled to said EI repository for allowing a user of the object management system to interactively create ones of said plan objects by selecting for each of said plan objects said associated one of said process objects and said selectable set of the code and data modules.

29. The process-based tool interface of claim 28, wherein said plan creation means includes user interface means whereby each of said plan objects is created by selecting process objects described using natural language descriptions that are independent of any one of the tool interfaces.

30. The process-based tool interface of claim 24, and further including plan execution means coupled to said EI repository for executing a selectable one of said plans to automatically execute said respective task against said selectable set of the one or more software modules.

31. The process-based tool interface of claim 30, and further including plan hub means coupled to said plan execution means for creating a plan execution object stored in said EI repository for recording execution status generated during the execution of said selectable one of said plan objects.

32. For use in an object management system for managing software modules, the object management system including a repository to store objects, ones of the objects being asset elements that are each descriptive of a respective software module, the object management system further including tools for performing functions on selectable ones of the software modules, a computer-implemented method of providing a process-based user interface for the object management system, comprising the steps of:

a.) storing in the repository a set of protocol type definitions, each of said protocol type definitions including a function invocation for invoking a respective one of the functions performed by an associated one of the tools;

b.) storing in the repository a set of process type definitions, ones of said process type definitions identifying one or more protocol type definitions for the purposes of describing a task accomplished by the functions performed by said identified one or more protocol type definitions; and c.) defining as a plan object a description that may be used to perform a selectable task on a selectable group of the software modules, wherein said task is defined by identifying one or more of said process type definitions.

33. The method of claim 32, wherein step c) includes the steps of:

c1) creating at least one protocol object each to include a function invocation for use in invoking an associated one of the tools, each protocol object being created using a selectable one of said protocol type definitions;

c2) creating at least one process object using a selectable one of said process type definitions, said at least one process object each to identify said at least one protocol object, wherein the function invocation included in the identified protocol object is utilized to accomplish the task described by said selectable one of said process type definitions; and c3) recording within said plan object an identifier identifying a selectable one of said at least one process object and identifiers identifying one or more selectable ones of said asset elements, wherein said task described by said selectable one of said at least one process object is to be executed on the software modules described by said one or more selectable ones of said asset elements.

34. The method of claim 33, wherein step c2) includes storing in each said process object a definition describing an executable script to be executed to accomplish said task.

35. The method of claim 34, wherein step c2) includes the step of polling the user to allow for interactive selection of said selectable ones of said asset elements.

36. The method of claim 34, wherein said step c2) includes storing a relationship in the repository to associate a respective one of said at least one process object with a respective one of said at least one protocol object.

37. The method of claim 34, wherein said step c3) includes the step of storing a relationship in the repository to associate said plan object with said selectable one of said at least one process object.

38. The method of claim 33, wherein step c3) includes the steps of:

c3-1) polling a user to allow for interactive selection of a process object;

c3-2) locating within the repository said at least one protocol object identified by said selected process object; and c3-3) copying said function invocation from each located protocol object into said plan object.

39. The method of claim 38, wherein each said at least one protocol object identified in said at least one process object is identified by a respective relationship indicator, wherein said relationship indicator identifies a relationship existing between said at least one process object and a respective one of said at least one protocol object, and wherein step c3-2) includes the step of traversing each said relationship to locate within the repository said at least one protocol object.

40. The method of claim 40, and further including the step of:

d) automatically executing said description included in said plan object to perform said selectable task on said selectable group of the software modules.

41. The method of claim 40, wherein step d) includes the step of scheduling automatic execution of said description included in said plan object for one or more predetermined times and dates.

42. The method of claim 40, and further including the step of:

e) creating an object in the repository to store the execution status for the automatic execution of said description included in said plan object.

43. The method of claim 33, wherein said step c1) includes creating a tool object in the repository to described each of the tools, and further storing a relationship in the repository to associate a respective one of said at least one protocol object with the tool object that describes said associated one of the tools.

44. The method of claim 33, wherein said step c3) further includes the step of storing a respective asset relationship in the repository for each of said selectable ones of said asset elements, each said asset relationship to associate a respective one of said selectable ones of said asset elements with said selectable one of said at least one process object.

45. The method of claim 32 wherein step a) includes the step of storing in the repository tool type definitions each describing a respective one of the tools, and for further storing in the repository for each of said protocol type definitions, a relationship type definition associating each of said protocol type definitions with a respective one of the tool type definitions.

46. The method of claim 32 wherein step b) includes the step of storing in the repository for ones of said process type definitions, a relationship type definition associating each of said ones of said process type definitions with a respective one of said one or more associated protocol type definitions.

\* \* \* \* \*

UNITED STATES PATENT AND TRADEMARK OFFICE
CERTIFICATE OF CORRECTION

PATENT NO.   : 6,785,882 B1
DATED        : August 31, 2004
INVENTOR(S)  : David A. Goiffon, Gerald E. Hartmann and David R. Johnson It is certified that error appears in the above-identified patent and that said Letters Patent is hereby corrected as shown below:

Title page,
Item [54], Title, should read -- A PROCESS-DRIVEN TOOL INTERFACE FOR AN OBJECT MANAGEMENT SYSTEM --

Column 49,
Line 7, "The method of claim 40" should read -- The method of claim 33 --.

Signed and Sealed this

Eighth Day of February, 2005

JON W. DUDAS
*Director of the United States Patent and Trademark Office*